US007277837B2

(12) United States Patent
Minton, Jr.

(10) Patent No.: US 7,277,837 B2
(45) Date of Patent: Oct. 2, 2007

(54) METHOD FOR FLOW ANALYSIS UTILIZING CELL ELEVATION TOPOLOGY

(75) Inventor: Joseph Grayson Minton, Jr., Charlotte, NC (US)

(73) Assignee: Hayes, Seay, Mattern & Mattern, Inc., Roanoke, VA (US)

( * ) Notice: Subject to any disclaimer, the term of this patent is extended or adjusted under 35 U.S.C. 154(b) by 574 days.

(21) Appl. No.: 10/649,271

(22) Filed: Aug. 27, 2003

(65) Prior Publication Data

US 2005/0049802 A1    Mar. 3, 2005

(51) Int. Cl.
    *G06G 7/48*    (2006.01)
(52) U.S. Cl. .................... 703/6; 703/2; 703/5; 703/9
(58) Field of Classification Search .............. 703/2, 703/5, 6, 9
    See application file for complete search history.

(56) References Cited

OTHER PUBLICATIONS

Liang et al, "A General Model of Watershed Extraction and Representation using Globally Optimal Flow Paths and Up-slope Contributing Areas", International Journal of Geographical Information Science, vol. 14, No. 4, 2000, pp. 337-358.*
Venkatachalam et al., "Automatic Delineation of Watersheds for Hydrological Applications", 22nd Asian Conference on Remote Sensing, Nov. 2001.*
Toma et al., "Flow Computation on Massive Grids", ACM-GIS 2001, Nov. 2001.*
Lacroix et al., "Using Digital Terrain Analysis Modeling Techniques for the Parameterization of a Hydrologic Model", Environmental Modelling & Software, vol. 17, Issue 2, 2002, pp. 125-134.*
Garbrecht and Martz, "Topaz Overview", USDA Agricultural Research Service, Apr. 1999, Internet download from http://grl.ars.usda.gov/topaz/OVIEW.HTM, USA.

(Continued)

*Primary Examiner*—Kamini Shah
*Assistant Examiner*—Herng-der Day
(74) *Attorney, Agent, or Firm*—Woods Rogers PLC; Peter E. Rosden

(57) ABSTRACT

A method for generating hydrologically correct flow vectors based on elevation data in a watershed which includes any one or more of depressions, flat areas and peaks. The watershed is typically divided into a plurality of major cells each of which encompasses a plurality of minor cells, and a user selects one or more major cells for which flow vectors are desired. Flow vectors are then calculated pursuant to the D8 method and assigned to those minor cells in the selected major cell and in surrounding major cells for which an optimal D8 solution is possible. The remaining minor cells are designated as zero vector cells and include those cells located in the problem areas. The method then generates flow vectors for minor cells in all depressions, flat areas and peaks, in that order, which exist in the selected major cells.

14 Claims, 19 Drawing Sheets

OTHER PUBLICATIONS

Jenson and Domingue, Extracting Topographic Structure from Digital Elevation Data, Photogrammetric Engineering and Remote Sensing, vol. 54, No. 11, Nov. 1988, pp. 1593-1600, USA.

Fairfield and Leymarie, Drainage Networks From Grid Digital Elevation Models, American Geophysical Union, Water Resources Research, vol. 27, No. 5, pp. 709-717 (May 1991), USA.

TRIBE, Automated recognition of valley lines and drainage networks from grid digital elevation models: a review and a new method, J. of Hydrology, 139 (1992), pp. 263-293, UK.

Garbrecht and Martz, Digital Elevation Model Issues in Water Resources Modeling, download from http://grl.ars.usda.gov/topaz/esri/paperH.htm, Jul. 1999, USA.

Garbrecht and Martz, The assignment of drainage direction over flat surfaces in raster digital elevation models, J. of Hydrology 193 (1997), pp. 204-213, USA.

Martz and Garbrecht, The treatment of flat areas and depressions in automated drainage analysis of raster digital elevational models, Hydrological Processes 12, pp. 843-855 (1998), USA Martz and Garbrecht, An outlet breaching algorithm for the treatment of closed depressions in a raster DEM, Computers & Geosciences 25 (1999), pp. 835-844, CN.

* cited by examiner

FIG. 3

| R0010C0006 | R0010C0007 | R0010C0008 | R0010C0009 | R0010C0010 |
|---|---|---|---|---|
| R0009C0006 | R0009C0007 | R0009C0008 | R0009C0009 | R0009C0010 |
| R0008C0006 | R0008C0007 | R0008C0008 | R0008C0009 | R0008C0010 |
| R0007C0006 | R0007C0007 | R0007C0008 | R0007C0009 | R0007C0010 |
| R0006C0006 | R0006C0007 | R0006C0008 | R0006C0009 | R0006C0010 |

| R0010C0006 | R0010C0007 | R0010C0008 | R0010C0009 | R0010C0010 |
|---|---|---|---|---|
| R0009C0006 | Buffer Cell | Buffer Cell | Buffer Cell | R0009C0010 |
| R0008C0006 | Buffer Cell | Center Cell | Buffer Cell | R0008C0010 |
| R0007C0006 | Buffer Cell | Buffer Cell | Buffer Cell | R0007C0010 |
| R0006C0006 | R0006C0007 | R0006C0008 | R0006C0009 | R0006C0010 |

METHOD FOR FLOW ANALYSIS UTILIZING CELL ELEVATION TOPOLOGY

This nonprovisional patent application is submitted with two copies of a compact disc meeting the requirements of 37 C.F.R. §1.52(e)(5). The first disc is marked Copy #1 and the second disc is marked Copy #2. Each disc is further identified by inclusion thereon of the Title of the Invention, which is Method for Flow Analysis Utilizing Cell Elevation Topology and the name of the Inventor, which is Joseph Grayson Minton, Jr. The file included on this disc is named Frm9FlowVec.frm, having a size of 282 Kb. This file was created on Aug. 20, 2003. This computer program listing is specifically, fully incorporated herein by reference.

TECHNICAL FIELD

The subject invention relates generally to a method and system for determining water flow directions in a watershed given a gridded array of digital elevation data. In particular, this method uses gridded elevation data to generate flow vectors indicating optimal flowpaths through depressions, flat areas and peaks occurring in the watershed.

BACKGROUND OF THE INVENTION

Advances in terrain data collection have spurred the need for new tools to work with this data to provide reliable, precise hydrologic and hydraulic models. More accurate sources are making new types of data with larger file sizes available, but previous tools are not optimized for working with the larger volume of this new data. The new data is forcing the development of better systems to handle storing and accessing these large terrain files, as well as new methods for converting the raw data into a useful format that an engineer can use in model generation. Other tools that are needed to deal with the new types of terrain data include methods for generating three-dimensional breaklines along a stream channel based on adjacent elevations, for testing the accuracy of new data, and for creating accurate streamlines through watersheds.

One major problem with terrain models based on elevation data is determining how to make such models hydrologically correct. Natural depressions are present in any raw terrain data format, and determining how to route water or liquid flow out of these areas is difficult. Software, such as the TOPAZ system of the U.S. Department of Agriculture, is known that has attempted to solve this problem by extracting relevant data from raster Digital Elevation Models (DEM) and modifying it. Modified DEMs can be used, for example, for any type of terrain modeling and visualization. Software such as TOPAZ modifies DEM data that is suitable for use by an independent Geographic Information System (GIS). The data is produced by the known D8 method pursuant to which watersheds are divided into cells. Flow vectors are calculated indicating the flow direction from a source cell to one of eight adjacent cells based on the adjacent cell having the steepest downstream slope in relation to the source cell. Once a flow vector has been determined for every cell in a watershed, the model for that watershed is considered to be hydrologically correct. Flow vectors can be used for a variety of purposes including, but not limited to streamline generation, raindrop flowpath tracing, drainage area calculation and determination of the extents of hazardous waste spills.

Unfortunately, the resulting model may be imprecise due to the manner of its handling of depressions and their inherent characteristics. Depressions are areas where the source cell is lower than all eight of its neighbors. These are depressions in the DEM where water will pond. Some programs raise the elevation of the depression digitally in an effort to determine flow direction. As a result, such programs artificially fill all depressions so that inaccurate elevations are created below the calculated outlets.

Another major problem in watershed DEM's is the way in which peaks are handled. Peaks are cells in which there are multiple best directions for the water to flow based on D8 criteria. Some programs solve this problem by applying a purely random solution, but that does not guarantee duplicate results for subsequent runs.

Still a further problem is that programs like TOPAZ have the option of breaching depressions, but they limit the extent of the hydrologic corrections to two DEM cells. This might be acceptable for coarse DEM's with a large cell size, such as 50 feet, but finer DEM's often require more detailed methods for fixing depressions.

Finally, other methods of handling hydrological corrections do not appear capable of handling tiled data. Programs such as TOPAZ are designed to work in a manner that involves processing the entire study area at once, however there is a limit to the maximum number of DEM cells that can be examined at one time. Dividing the study area into different tiled regions and solving each one separately can circumvent this, but the problem arises when corrections are required to span across multiple tiles. If a flat area lies along the border of two tiles and is solved in one manner on the first tile, but in a different manner on the second tile, there is no guarantee that the resulting flow vectors of the two tiles will agree. This often results in cases where flow vectors point at each other along tile boundaries, creating an unsolvable situation that we call an infinite loop.

What is needed, therefore, is a method of efficiently handling the extremely large data sets being provided by available analysis techniques while also producing a watershed model which accurately portrays flow directions through depressions, flat areas and peaks without degrading the raw data from which such flow directions are generated. Similarly, such a method should be capable of providing flowpaths that extend far beyond the edge of depressions, flat areas and peaks across a major portion of the watershed and should enable the handling of tiled data sets.

SUMMARY OF THE INVENTION

The present invention relates to a method for generating hydrologically correct flow vectors for all or part of a watershed comprised of at least one rectangular major cells having a predefined size and encompassing at least nine minor cells having a predefined size and rectangular shape. The invention is useful in creating flow vectors for minor cells located in one or more problem areas defined as depression areas, flat areas and/or peaks. The number, location and elevation of all major and minor cells are known as are the maximum depth depression to be corrected, the maximum number of downstream minor cells to check in fixing peaks as well as the largest depression area and largest flat area to fix. A buffered array is created comprised of all minor cells in a designated major cell and in all other major cells bordering the designated major cell using the known D8 method. Then, flow vectors in the value of one to nine (direction value five is not used) are generated for all minor cells in the buffered array. If the D8 method does not yield a clear flow vector for a particular minor cell, the minor cell is in a problem area, and a value of zero is assigned. The method fixes the problem areas by providing corrected flow vectors for minor cells in those areas and modifying the elevations of minor cells, as needed. After determining in what type of problem area the minor cell having a zero value flow vector is located, a first attempt is made to calculate corrected flow vectors for those areas. First, all depression areas are fixed starting with the depression having the highest elevation and then correcting depressions having with successively lower elevations. Next, all flat areas are fixed. Finally, all peaks are fixed starting with the peak having the lowest elevation and then correcting peaks having successively higher elevations. Thereafter, flow vectors are recalculated for all minor cells in the buffered array and a second attempt is made, if necessary, to calculate corrected flow vectors for any remaining minor cells having zero flow vector values. The resulting flow vectors and elevations, as modified, are stored and the process is repeated on another designated major cell, if desired. These flow vectors can be used for a variety of purposes including, but not limited to, basin delineation, time of concentration calculation, flow-path tracing, drainage area calculation, determination of the extents of hazardous waste spills and streamline generation.

It is a primary objective of this invention to provide a method for accurately correcting hydrological terrain data to indicate water flow directions while simultaneously preserving the accuracy and integrity of the raw terrain data.

An additional objective of this invention is to provide a method for automatically fixing depressions in raster digital elevation models to generate hydrologically correct models without artificially filling the depression.

Another objective of this invention is to provide a method for generating flow vectors useful in producing flowpaths through depressions that more closely follow the contours of the terrain that existed prior to generating the flow path.

It is a further objective of this invention to provide a method for generating more hydrologically correct flow vectors for smaller DEM's than has previously been possible.

It is yet another objective of this invention to provide an advantageous order for handling problem cells in hydrologic models, that order being, first, all depressions, second, all flat areas and, third, all peaks.

It is still another objective of this invention to provide an improved method for generating more accurate flow vectors for peaks in hydrological models.

Yet an additional objective of this invention is to provide a method for handling tiled hydrological data so that different solutions to related problems in different tiles will complement each other.

BRIEF DESCRIPTION OF THE DRAWINGS

The foregoing and other objects, aspects and advantages of the invention will be better understood from the following detailed description of the invention with reference to the drawings, in which

FIG. 3 is a partial index grid identifying major cells by row and column number with one major cell designated for processing.

DESCRIPTION OF THE PREFERRED
EMBODIMENT OF THE INVENTION

The method of this invention uses data derived from geological Digital Elevation Models (DEM's) to generate flow vectors based on a flow analysis utilizing cell elevation topology and is hereinafter referred to as FAUCET. The method derives input data from Digital Terrain Model data (DTM) that has been used to produce Triangular Irregular Network models (TIN's) for floodplain mapping and grid-based Digital Elevation Models (DEM's) for delineating basins and generating streamlines.

Figure 1:
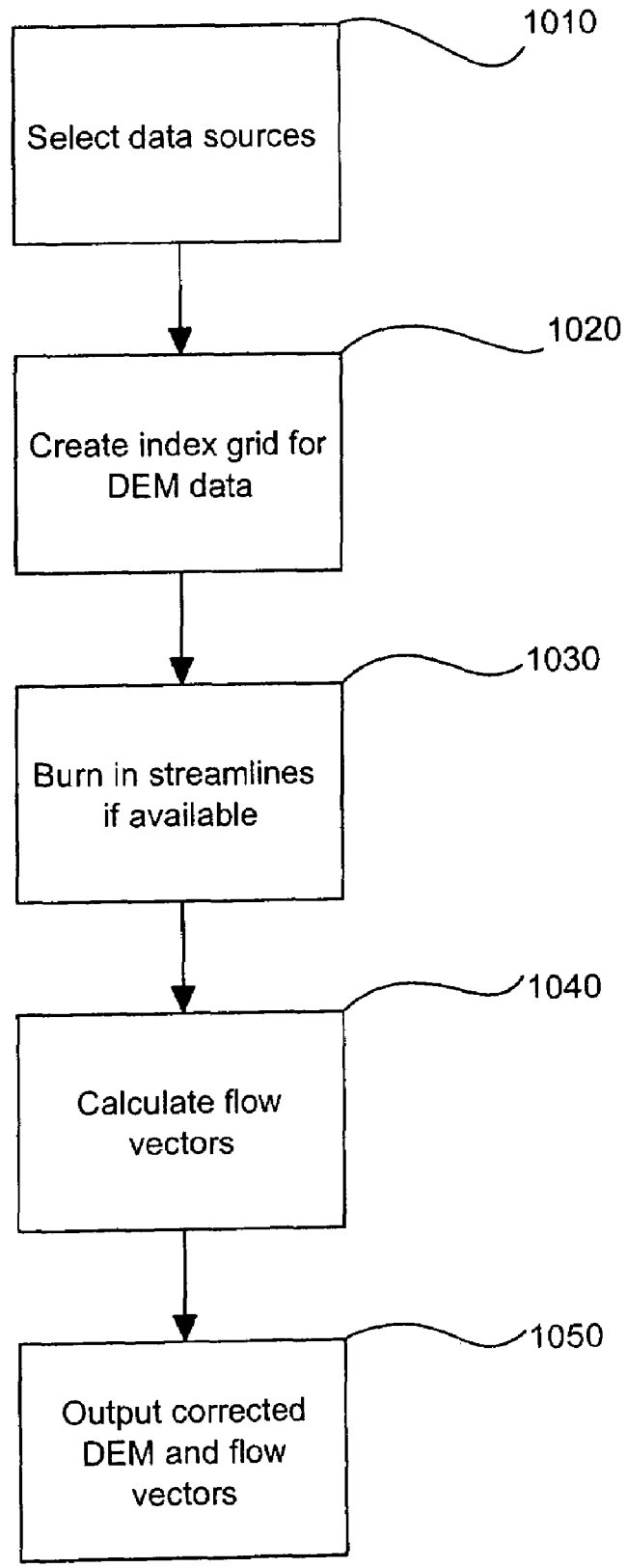
FIG. 1 is a flowchart providing a general overview of a hydrological modeling process in which the method of the invention may be employed.

FIG. 1 displays a general overview of a hydrological modeling process in which the method of this invention may be used. At 1010, one or more sources of terrain data is selected to provide a basis from which flow vectors will eventually be calculated, as needed. At 1020, the user creates an index shapefile containing numerous index cells that represent the DEM data being processed. An index cell is one that is uniform in size and conforms to the extents of the DEM data source. Such index cells are referred to as major cells, and each DEM cell contained within a major cell is referred to as a minor cell. There may be thousands of major cells and thousands of minor cells within any given major cell. However, there must be a minimum of ten cells, one major cell encompassing nine minor cells, to apply the D8 flow vector assignment method described below. Each major cell and each minor cell has a rectangular shape, the dimensions of each of which are predefined either by a user or by default parameters. If detailed streamlines are available, the user has the option of burning them into the DEM's at 1030 by artificially imposing elevation modifications on the elevations of all minor cells through which this streamline flows. Flow vectors are then calculated at 1040 based on parameters and other input data supplied either by the user or as default values including maximum depth depression to fix, maximum number of downstream cells to check for peaks, maximum size flat area to fix and a location to which detailed output files should be transferred, if desired. Once FAUCET has completed processing this area, the resulting DEM's and flow vectors are stored and can then be exported at 1050 to an external program to be used for other purposes such as basin delineation, time of concentration calculation and streamline generation.

Figure 2:
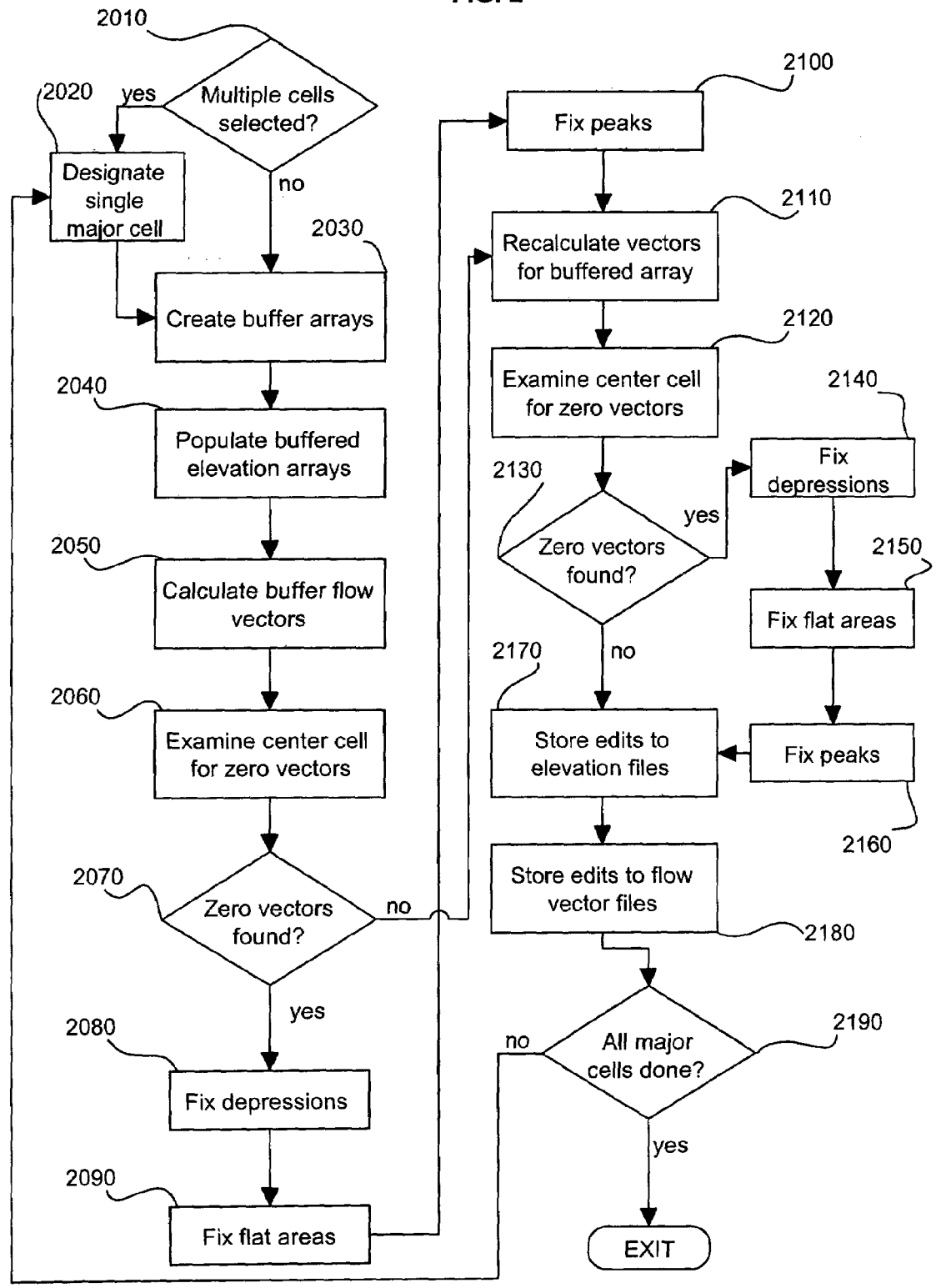
FIG. 2 presents a flowchart diagram illustrating an overview of the flow vector generation process of this invention.

FIG. 2 is a flowchart illustrating a general overview of the FAUCET process for creating flow vectors corresponding to 1040 above. The source code for controlling the performance of this process by a computing device is presented on the accompanying computer program listing appendix. In creating flow vectors, a user may elect to apply the FAUCET method to a single major cell, a group of major cells or every cell in a project. However, in each case, FAUCET creates flow vectors on a cell-by-cell basis. Thus, in the event of a multi-cell selection by the user at 2010, the process randomly designates one of the major cells at 2020 as the initial selected major cell for which flow vectors will thereafter be calculated. Random selection is satisfactory since the order of selection of major cells does not affect the outcome of the process. FIG. 3 displays a portion of the index grid generated at 1020 in which major cell R0008C0008 (row 8, column 8) has a heavy border to indicate that the user has elected to create flow vectors for that major cell. The default variables (minor cell size, major cell size, minimum X, Y coordinates of the index) as well as user-defined parameters such as maximum size flat area and maximum depth of depression are needed to calculate flow vectors.

Figures 4, 5:
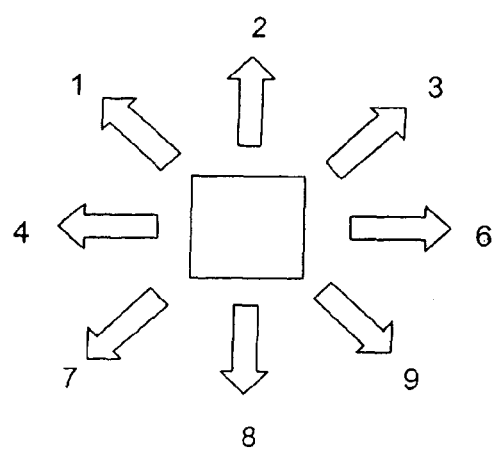
FIG. 4 is a partial index grid showing major cells buffering a selected major cell.
FIG. 5 shows the eight directions that flow vector integers indicate.

Returning to FIG. 2, arrays are created to store all of the elevation and flow vector data at 2030. In order to anticipate a situation where the flow vector of a minor cell on the border of a designated major cell results in changes beyond the border of the designated major cell, these arrays are extended beyond the original major cell of interest (herein called the center cell) to further comprise all of the minor cells located within the eight major cells surrounding the designated major cell. Minor cell elevation data for each of the cells in this elevation array is retrieved from storage and transferred so as to be associated with corresponding cells in the elevation array at 2040. The result is an elevation array having all of the minor cell elevation data for a 3-by-3 array of major cells encompassing the designated major cell in its center, and buffered by eight other major cells around its perimeter as shown in FIG. 4. This array of cells is referred to as the buffered array.

Figure 6:
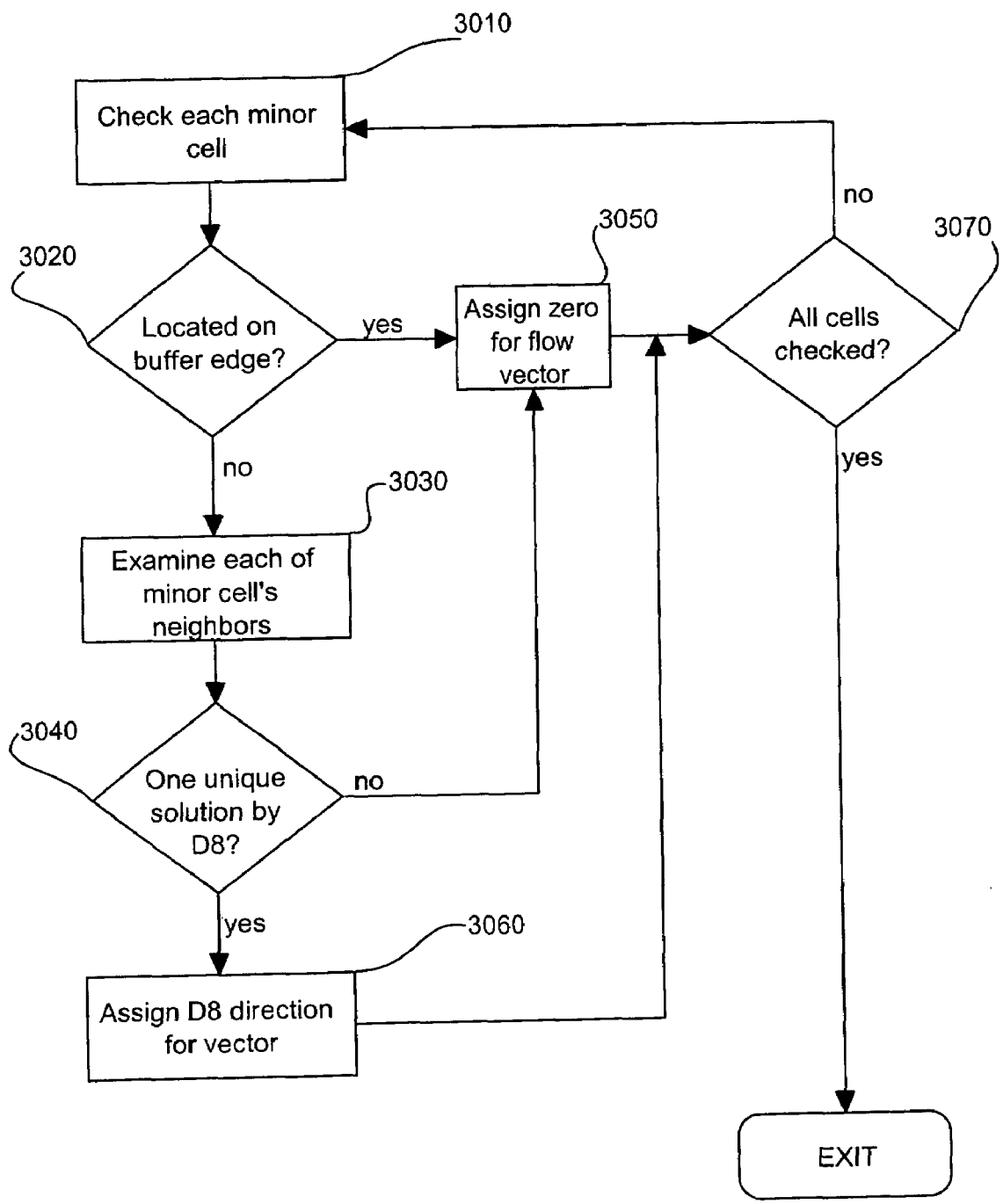
FIG. 6 is a flowchart diagram illustrating the process for assigning D8 directions to flow vectors.

Returning again to FIG. 2, before any further processing occurs, flow vectors must be calculated to the extent possible for the all of the minor cells stored in the buffered array at 2050. The details of this calculation are illustrated in FIG. 6, discussed below. All of the flow vectors within the extents of the center cell are examined at 2060 looking for any problem cells. A problem cell is a minor cell to which a definite flow vector cannot be assigned, usually because the cell is in a depression, flat area or peak. Such cells are termed zero vector cell. If it is determined at 2070 that there are zero vector cells contained in the center cell, FAUCET then proceeds to fix the problems.

FAUCET attempts to first fix all depressions in a selected major cell at 2080, then all flat areas at 2090 and finally all peaks at 2100. This order has been found to be advantageous in that it enhances the speed and efficiency of the overall process. For example, sometimes a depression might be in the middle of a region of flat cells, so by fixing the depression first, the flat problem may be fixed simultaneously, or at least a change may be made that will make the flat area easier to fix. In addition, if flat areas were fixed before depressions, a flowpath might end up routing flow to a depression that would simply complicate the fixing process. Peaks are fixed last since they are usually seen around the edges of flat areas, and once flat areas are fixed the number of peaks is minimized or may disappear altogether.

After FAUCET makes a first pass at fixing all of the problems, the flow vectors are recalculated for the buffered array at 2110 and examined again at 2120. If it is determined that problems still remain in the center cell's extents at 2130, FAUCET once again tries to fix all of the depressions at 2140, followed by the flat areas at 2150 and then the peaks at 2160.

At this point FAUCET has made 2 passes through the center cell in an attempt to calculate the flow vectors and solve any problems. The resulting elevations as changed are saved to the appropriate elevation files at 2170, and the edited flow vectors are saved to the appropriate flow vector files at 2180. If all major cells have not been processed, as determined at 2190, another major cell is selected at 2020 and processing of that cell occurs. If all major cells have been processed, FAUCET is exited.

Flow vectors are represented by an integer ranging from "0" to "9". The number assigned to each cell in the array signifies either a flow direction (in the case of numbers "1" to "9"), as shown in FIG. 5, or that the minor cell is a problem cell (in the case of a "0"). These flow vector numbers are associated with each respective minor cell in the array by means of storage in a flow vector file. FIG. 6 illustrates how flow vectors are calculated for an array of elevations. The routine checks each minor cell in the buffered array in no particular order, since the order is not important. Initially, the cell under scrutiny is checked at 3010 to see if it is located at the outermost edge of the buffered array at 3020. If it is on the edge, a value of "0" is assigned to this cell, flagging it as a problem or "zero-vector" cell, and the process proceeds to check the next minor cell. The reason that a cell on the edge is a problem is because it is impossible to examine all eight of its neighbors to determine a flow direction based on the D8 method described below. However, this is not a major difficulty since the process is only concerned with fixing problems in the center cell, and any buffer edge problems will be at the extents of the surrounding buffer cells. The minor cell is then examined at 3030 to ascertain if a flow vector can be assigned using the D8 criteria known in the art according to which water will flow from one cell to an immediate neighbor cell having the steepest downstream slope or, phrased differently, the largest negative slope. If a cell does not have a distinct flow to which to apply these criteria, such as in the case of a cell in a depression, flat area or peak, that cell is also assigned a zero flow vector value at 3050. All cells having "0" assigned flow vector values are referred to as zero-vector cells. If a slope can be determined using the D8 rules, the appropriate flow vector number is assigned to that cell at 3060. Processing then continues at 3070 where a determination is made whether all minor cells in the elevation array have been assigned a flow vector. If not, processing returns to 3010.

Figure 7:
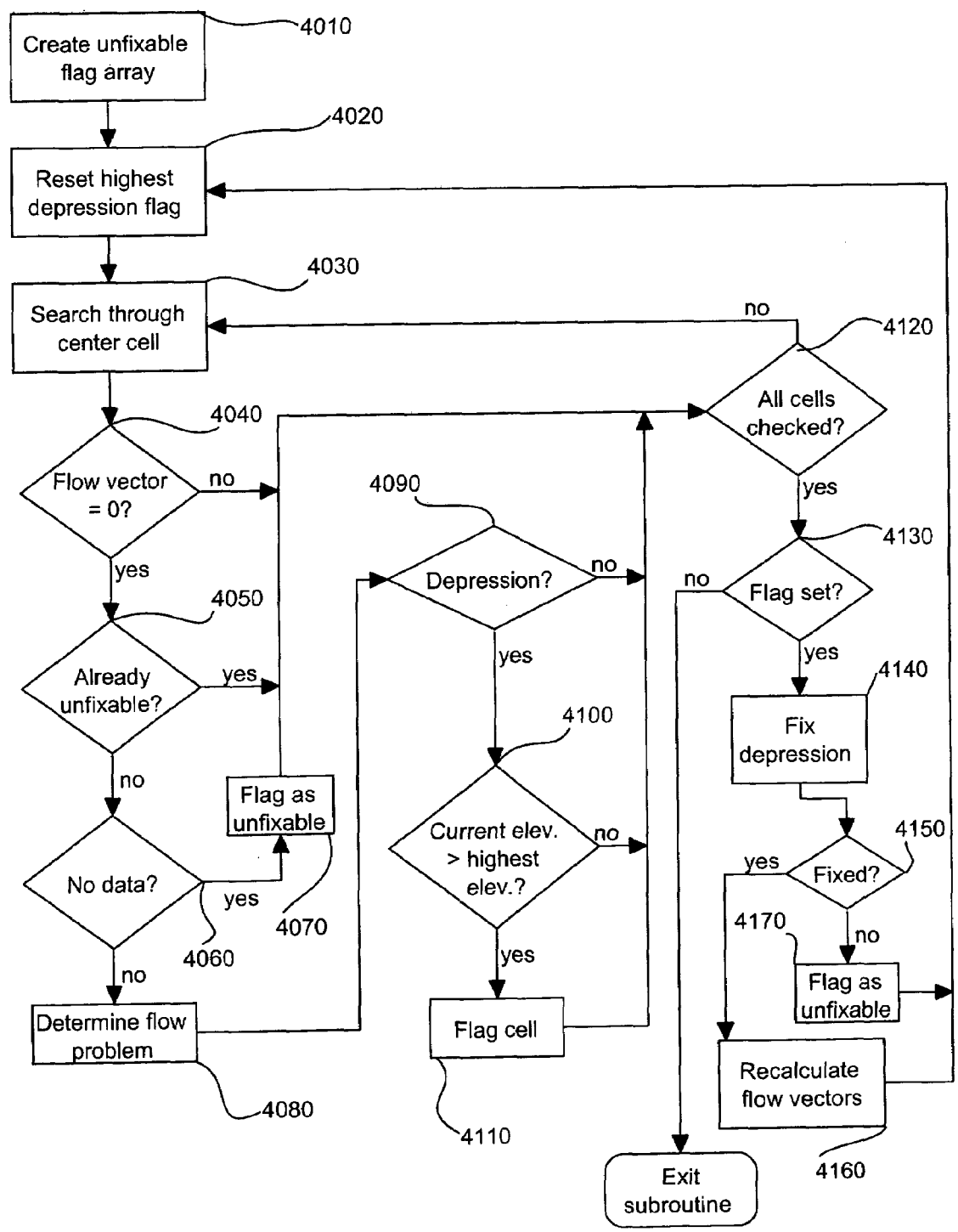
FIG. 7 is a flowchart diagram illustrating the overall process for fixing depressions.
Figure 8:
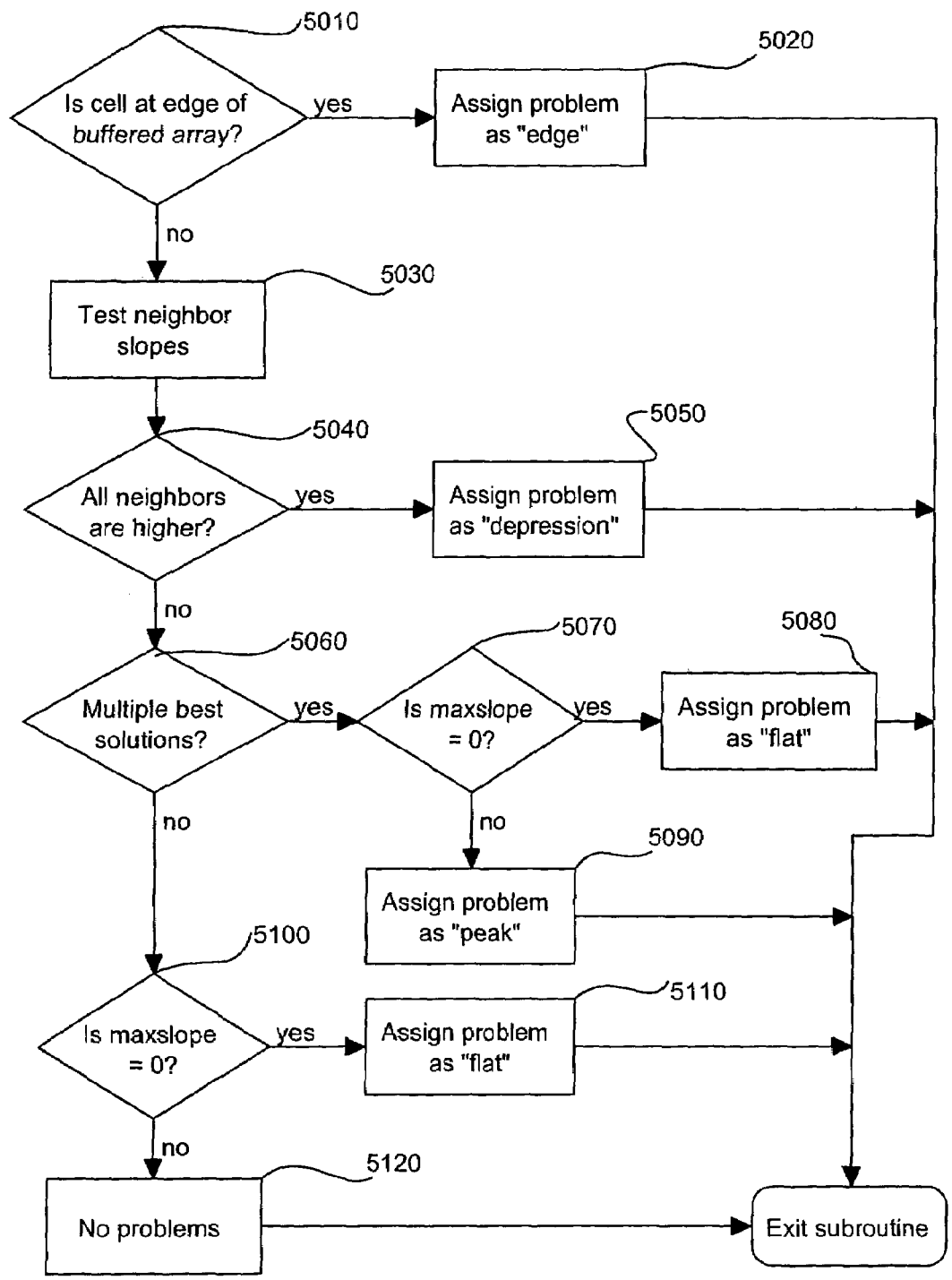
FIG. 8 is a flowchart diagram illustrating the process for determining and assigning the type of flow problem to a minor cell.

Once the initial flow vectors have been calculated for the buffered array and it has been determined that there are problems in the center cell, FAUCET first attempts to fix any depressions. FIG. 7 is a flowchart illustrating the overall process for fixing depressions. First, a Boolean array corresponding to the elevation array is created at 4010 to flag any problem cells that are determined to be unfixable. Then a variable is initialized at 4020 to keep track of the highest depression found. The importance of this variable will become apparent below since the depression fixing routine starts by fixing the highest depression areas first in order to better handle situations involving nested depressions. At 4030, a successive search of stored flow vector data relating to the minor cells within the center cell's extents is begun to identify zero vector cells. Each minor cell of the selected major cell is successively examined moving from left to right, lower row to upper row throughout the selected major cell in order to find and eventually "fix" zero vector cells. Note that the order in which cells are examined is not important for purposes of properly completing the described process. If a minor cell has a zero vector value, as determined at 4040, it is further examined at 4050 to ascertain if that cell has a problem that has already been deemed to be unfixable. If not, the elevation of that cell undergoes further review at 4060 to determine if it is −9999 (a NoData cell). If so, it is flagged as unfixable at 4070. In the event minor cells are encountered which are either not zero vector cells, are unfixable or are NoData cells, data, if any, for the next cell is retrieved at 4030. If a cell is a zero vector cell and is neither unfixable nor a NoData cell, a test is performed at 4080 to determine the cause of the flow problem. This process is illustrated in FIG. 8, discussed below. If it is determined that the zero-vector is caused by a depression at 4090, the elevation of the zero vector cell under consideration is compared to the elevation of the highest depression already found, if any, at 4100. If the depression being examined is higher than the highest depression already found, then the variable storing the highest depression is modified at 4110 to reflect this minor cell. If all minor cells have not been checked for depressions at 4120, then processing continues at 4030 to retrieve the next zero vector cell that is in a depression. Once all cells in depressions have been identified and examined, a check is performed at 4130 to determine if the flag has been set at 4110 indicating that a cell has been identified as having the highest depression elevation. If so, processing is transferred at 4140 to the routine for fixing depressions that is illustrated and discussed with respect to FIG. 9 below. If the depression-fixing routine successfully fixes the depression, as determined at 4150, the flow vectors are recalculated for this area at 4160, the highest depression variable is reset at 4020, and FAUCET starts searching through the center cell's extents again at 4030 to determine the next highest remaining depression. If the depression-fixing routine is unsuccessful, this minor cell is flagged as unfixable at 4170, the highest depression variable is reset at 4020, and the process attempts to look for the next highest depression at 4030. This process continues until all minor cells that are determined to be depressions in the center cell's extents have been fixed or are deemed unfixable, both of which are indicated if the flag at 4130 is not set, at which point FAUCET exits this routine and moves on to fixing flat areas.

The process for determining the cause of a flow problem referred to at 4080 in FIG. 7 is illustrated in detail in FIG. 8. At 5010, the minor cell is examined to see if it is on the edge of the buffered array, and is flagged at 5020 as an 'Edge' problem if appropriate. If not, all eight of this minor cell's neighbors are examined and their slopes are calculated at 5030. If all eight of the neighbors are at a higher elevation than the cell in question, as determined at 5040, the problem is a 'depression' and is so assigned to the cell at 5050. If not, the slopes are examined according to the D8 criteria. If there are multiple best solutions, as determined at 5060, the maximum slope is tested at 5070 to see if it is equal to "0". If it is, the problem is a flat area, and the problem is assigned as 'flat' at 5080. If the slope is not equal to "0", then this problem is due to a 'peak', and is flagged as such at 5090. Thus, where more than one of the neighbor cells of the minor cell has been found to have the steepest slope and this slope is not equal to zero, i.e. the elevations of the neighbor cells are not equal to that of the center minor cell, a peak has been found. If multiple best solutions were not found at 5060 but the maximum slope was determined to be "0" at 5100, then this is also a flat area problem and is assigned as such at 5110. Thus, there can be three neighbor cells with the exact same elevation, but if there is a neighbor with a lower elevation that provides a steeper slope, then that is the best solution. For a flat area to be found, the best solution (i.e. steepest slope) would have to point to a neighbor cell at the exact same elevation as the minor cell. So, that neighbor cell would be the lowest elevation found amongst the neighbor cells. However, if the maximum slope is not equal to zero, then a unique D8 solution can be found for this minor cell, and there are no problems as indicated at 5120. This subroutine is exited either after the problem has been identified and assigned or no problem has been found to exist.

Figure 9A:
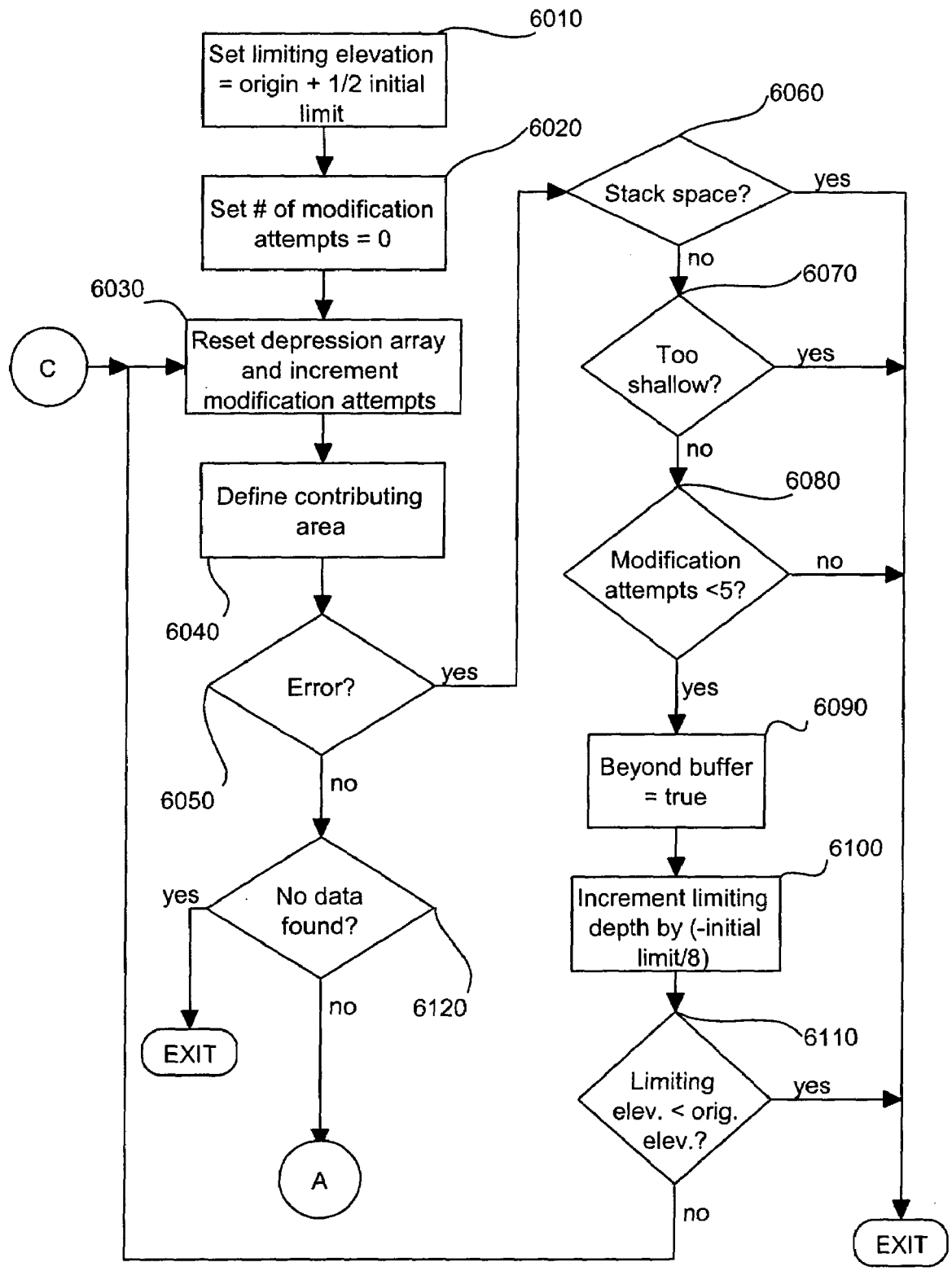
FIGS. 9A, 9B and 9C are a flowchart diagram illustrating the process for fixing depressions.
Figure 9B:
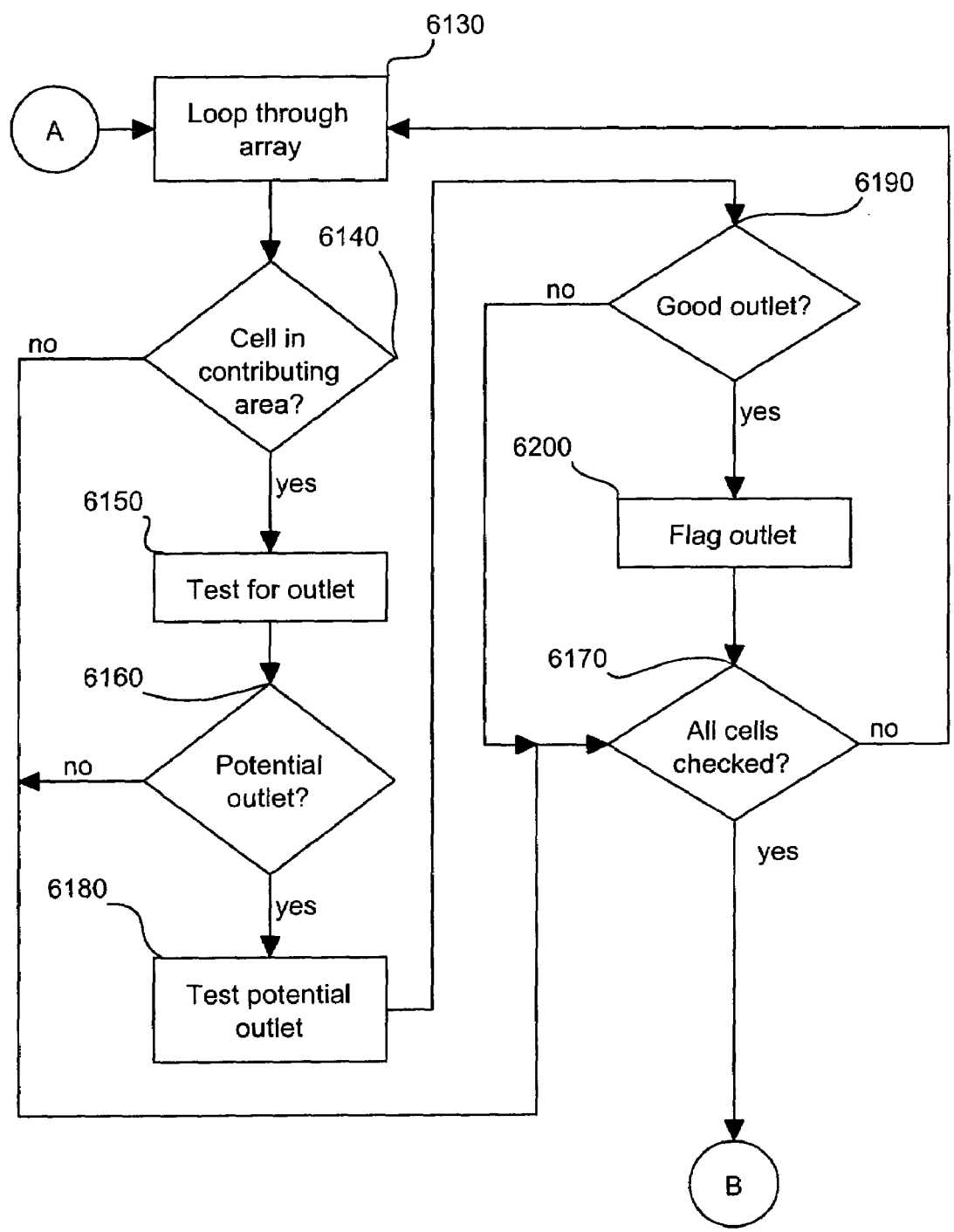
Figure 9C:
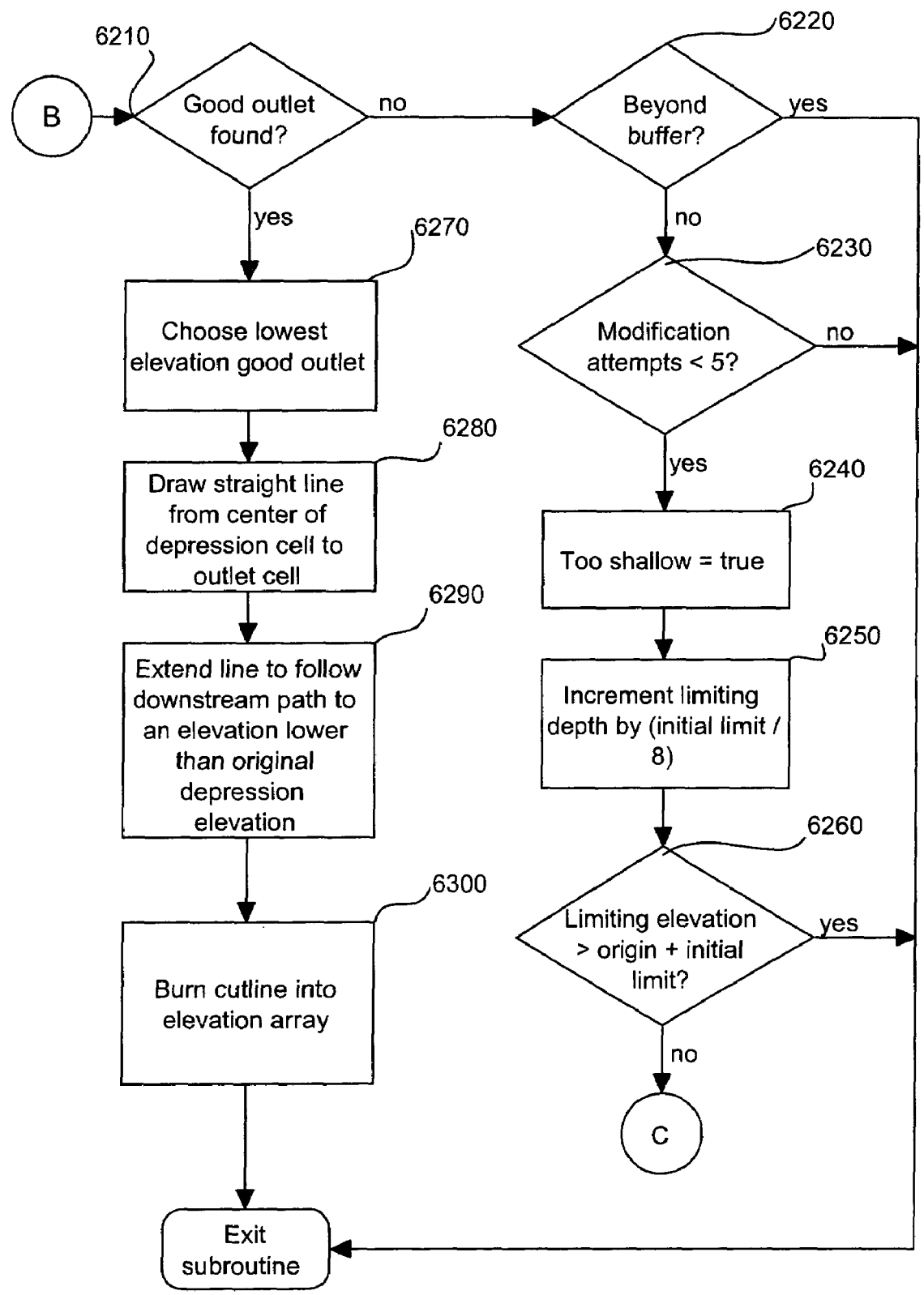

The process for correcting flow through depressions referred to at 4140 in FIG. 7 is presented in FIGS. 9A, 9B and 9C. Although this routine is constrained by the user-specified parameter for maximum depth depression to fix, it first attempts to fix the depression at half of the specified depth in order to speed up processing. Referring to FIG. 9A, this depth is set initially at 6010 and is equal to the depth of the original zero flow vector cell which caused the transfer of processing to this depression handling routine from 4140 plus one-half of the limit originally established on the maximum depth depression which can be corrected. At 6020, a variable is created that keeps track of the number of times the temporary limiting depth is modified. This is necessary to keep this routine from getting stuck in a loop. An array having the same size as the buffered elevation array is created at 6030 that will keep track of the minor cells that contribute to this depression, as well as which cells are potential outlets. The contributing area is defined at 6040 in a process that is explained in greater depth below in connection with FIG. 10. If any errors are encountered while defining the contributing area as determined at 6050, they are checked to see if they are critical. If the error is due to running out of stack space as determined at 6060, the memory capacity of this computer has been exceeded and FAUCET must exit the depression-fixing routine. If an error is raised and this area has already been flagged as being too shallow as determined at 6070, then FAUCET must exit the depression-fixing routine. This is because a previous iteration needed the temporary limiting depth to be raised in order to find a solution, and now, after raising the depth, the buffered array limits have been exceeded. If at 6080 the number of limiting elevation modification attempts is determined to be greater than a pre-defined limit which has been provisionally set at 5 iterations but may be a different number, then the depression-fixing routine is exited. If the error was not caused by any of these problems, then it is assumed at 6090 that the problem was due to the contributing area extending beyond the buffered area, and the temporary limiting depth is lowered by ⅛ of the initial depth limit at 6100. If this new limiting elevation is lower than the elevation of the original depression as determined at 6110, then the depression-fixing routine is exited; if not, processing resumes at 6030, the contributing area array is reset, and the number of modification attempts is incremented. Once a contributing area is successfully found without any errors indicated at 6050, a flag is checked at 6120 to see if any NoData cells were encountered in this area, in which case the depression-fixing process is exited. If this test is passed, FAUCET begins checking through the contributing area array in FIG. 9B at 6130. The checking may be performed successively going from the lower to the upper row, left to right, although the exact order of the checking is not material to the practice of the method. FAUCET examines each cell the contributing area, and if a cell has been flagged as being part of the contributing area to this depression, as determined at 6140, it is tested at 6150 to see if it is a potential outlet at 6160. The process for this test is explained in greater detail below in connection with FIG. 11. If a cell is not deemed to be a potential outlet, the process continues by determining whether all cells have been checked at 6170 and, if not, returning to 6130 to test the next minor cell. If a cell is determined to be a potential outlet, this potential outlet is tested at 6180 to see if it is a good outlet. This testing process is explained in FIG. 12 and below. If a cell is not determined to be a good outlet at 6190, the process continues by determining whether all cells have been checked at 6170 and, if not, returning to 6130 to test the next minor cell. If a cell is determined to be a good outlet, this cell is flagged as such at 6200 and the program continues testing any remaining cells. Once all of the cells in the contributing area have been tested, a check is performed at 6210 in FIG. 9C to make sure that at least one good outlet was found for this depression. If no good outlets were found and it was determined in a previous iteration that the contributing area extended beyond the buffered extents, as tested at 6220, the depression fixing routine is exited. Likewise, if the number of temporary limiting elevation changes is greater than the limit of 5 as determined at 6230, the subroutine is exited. If the number of iterations is less than 5, then it is determined that the maximum limiting depth is too shallow and a flag is raised at 6240 to indicate this. The temporary limiting elevation is then raised by ⅛ of the original limiting depth at 6250, and checked at 6260 to make sure that this depth is not greater than the original maximum elevation limit. If it is, the subroutine is exited, and if not the process returns to C on FIG. 9A, the depression array is reset, the number of modification attempts is incremented, and the process is repeated. If a good outlet is found at 6210, the outlet with the lowest elevation is selected to breach this depression at 6270. A hypothetical straight flow cutline is drawn from the original depression cell to this best outlet cell at 6280, and this line is extended downstream according to the D8 flow vectors at 6290 until it reaches a cell with an elevation lower than that of the original depression. At 6300, this cutline is burned into the elevation array, in effect thereby breaching the outlet. This is accomplished by artificially imposing elevation modifications on the elevations of all minor cells that this cutline passes through. At this point the depression-fixing algorithm for this depression is complete and the process attempts to fix the next highest depression.

Figure 10:
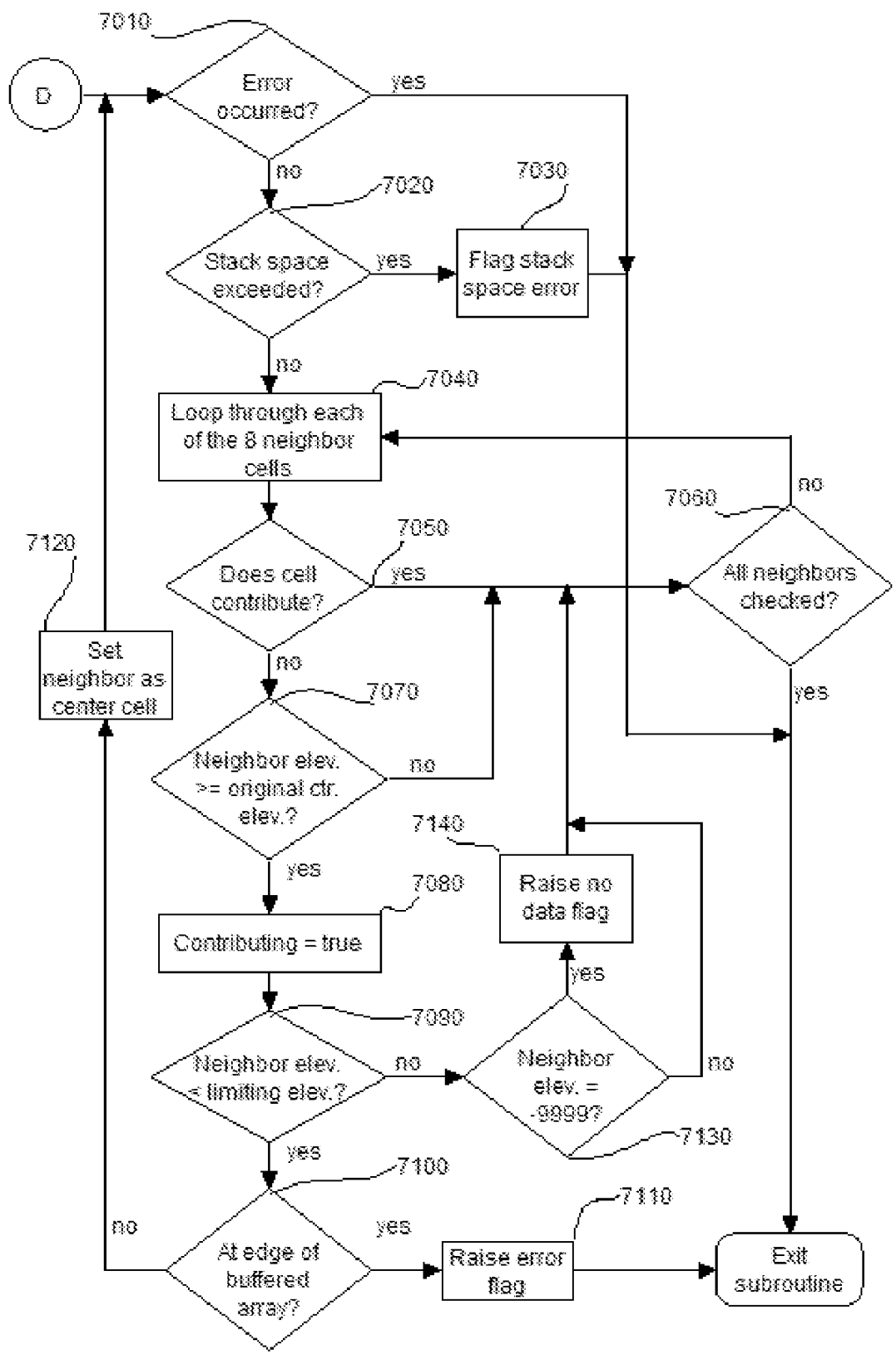
FIG. 10 is a flowchart diagram illustrating the process for identifying the minor cells that contribute to a depression.

The process for defining the contributing area to a depression, which was referred to at 6040 in FIG. 9A, is illustrated in FIG. 10. Contributing cells are defined as those that are the same elevation or higher than the current cell being examined. As a result of prior processing and user-selections or default values, the depression location and elevation along with the maximum depth depression for which to make hydrological corrections are known. By constraining the maximum depth depression to fix, the size of the overall depression area is limited. This is a recursive routine, so flags have been put into the code to test if the stack space on a computer is running low. In order to identify such cells, this routine is called for each minor cell in the selected major cell or cells that flags any neighboring minor cells which are equal to or higher in elevation than the current center cell.

Since the maximum depth depression to be corrected is known, the contributing area for the depression is defined as including any cell having a depth up to the elevation of the original zero-vector cell in the depression plus the maximum permitted depth correction. A minor cell location is passed into this routine at D. If an error has occurred, as determined at 7010, the subroutine is exited and processing returns to the routine that called this subroutine which in this case could be this routine itself. If not, a check is performed at 7020 to see if the stack space has been exceeded; if it has, the stack space error flag is set at 7030 and the subroutine is exited. If the stack space is within limits, the routine then checks all eight of the neighboring cells (the order is not important) at 7040 in an attempt to determine which of them contribute to this minor cell. If the cell has already been flagged as being part of the contributing area, as determined at 7050, the routine checks whether all neighbors have already been examined at 7060 and, if not, proceeds to check the next direction by returning to 7040. If the cell has not been so flagged, the elevation of the neighboring cell is tested at 7070 to see if it is equal to or greater than the current minor cell's elevation; if it is, the cell under consideration is flagged as being part of the contributing area at 7080. If not, the process continues by checking whether all neighbors have been examined at 7060 and, if not, proceeds to check the next direction by returning to 7040. If the neighboring elevation is less than the maximum depression depth limiting elevation, as determined at 7090, a check is performed at 7100 to make sure that this cell is not at the edge of the buffered array, in which case an error flag is raised at 7110 and the sub is exited. The reason that this is necessary is that in order for this result to occur, a depression would need to have extended outside of the original center major cell under examination and extended entirely across one of the major cells shown in FIG. 4 which buffer the major cell being tested. If this cell is not at the edge of the buffered array, the previously discussed routine is called again recursively, after setting the current neighbor cell as the new center cell at 7120. If the neighboring elevation is determined to be greater than the limiting elevation at 7090, a check is performed at 7130 to make sure that this is not a NoData cell before checking the remaining neighboring directions. If a NoData cell is encountered, a flag is raised at 7140, and if not, the routine proceeds to check the next direction by returning to 7060. Since this is a recursive routine, it will be called many times in a nested fashion, and can consume quite a bit of memory. Once all neighboring directions of all cells have been checked, the subroutine is exited.

Figure 11:
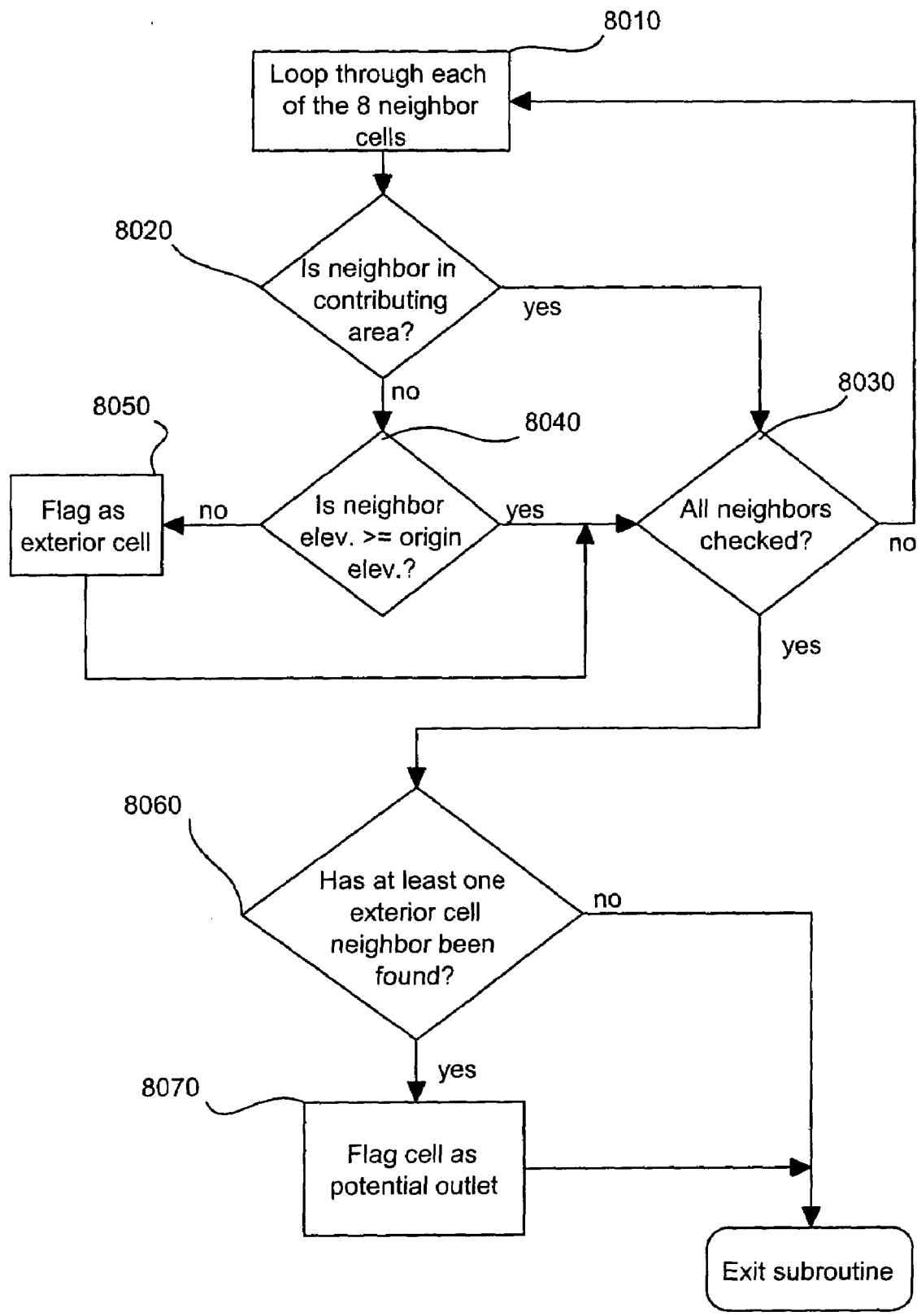
FIG. 11 is a flowchart diagram illustrating the process for identifying potential outlets to a depression.

The process for determining if a cell is a potential outlet is illustrated in the flowchart of FIG. 11. For a given minor cell, this routine will loop through all eight neighboring directions at 8010 to see which cell, if any, meets the criteria for being a potential outlet. A potential outlet is a minor cell that has a neighbor that is outside of or on the exterior of the contributing area with an elevation lower than the outlet elevation. In other words, it is a cell that is on the edge of the contributing area that will allow flow to exit the contributing area. For each neighboring direction, a test is performed to see if this neighbor is part of the contributing area at 8020; if it is, the routine verifies whether all neighbors have been checked at 8030 and, if not, returns to 8010 to check the next direction. If the neighbor is not part of the contributing area, its elevation is tested at 8040 to see if it is greater than or equal to the contributing cell's elevation; if it is not, this cell is flagged at 8050 as an exterior cell and the routine keeps testing the remaining directions by returning to 8030. If its elevation is greater or equal to that of the contributing cell, further testing of remaining directions by return to 8030 occurs without flagging the cell. Once all eight directions have been checked at 8030, a further check is performed at 8060 to see if at least one exterior cell has been identified; if so, it is flagged as a potential outlet at 8070 and the subroutine is exited. If not, the subroutine is exited without flagging a potential outlet.

Figure 12:
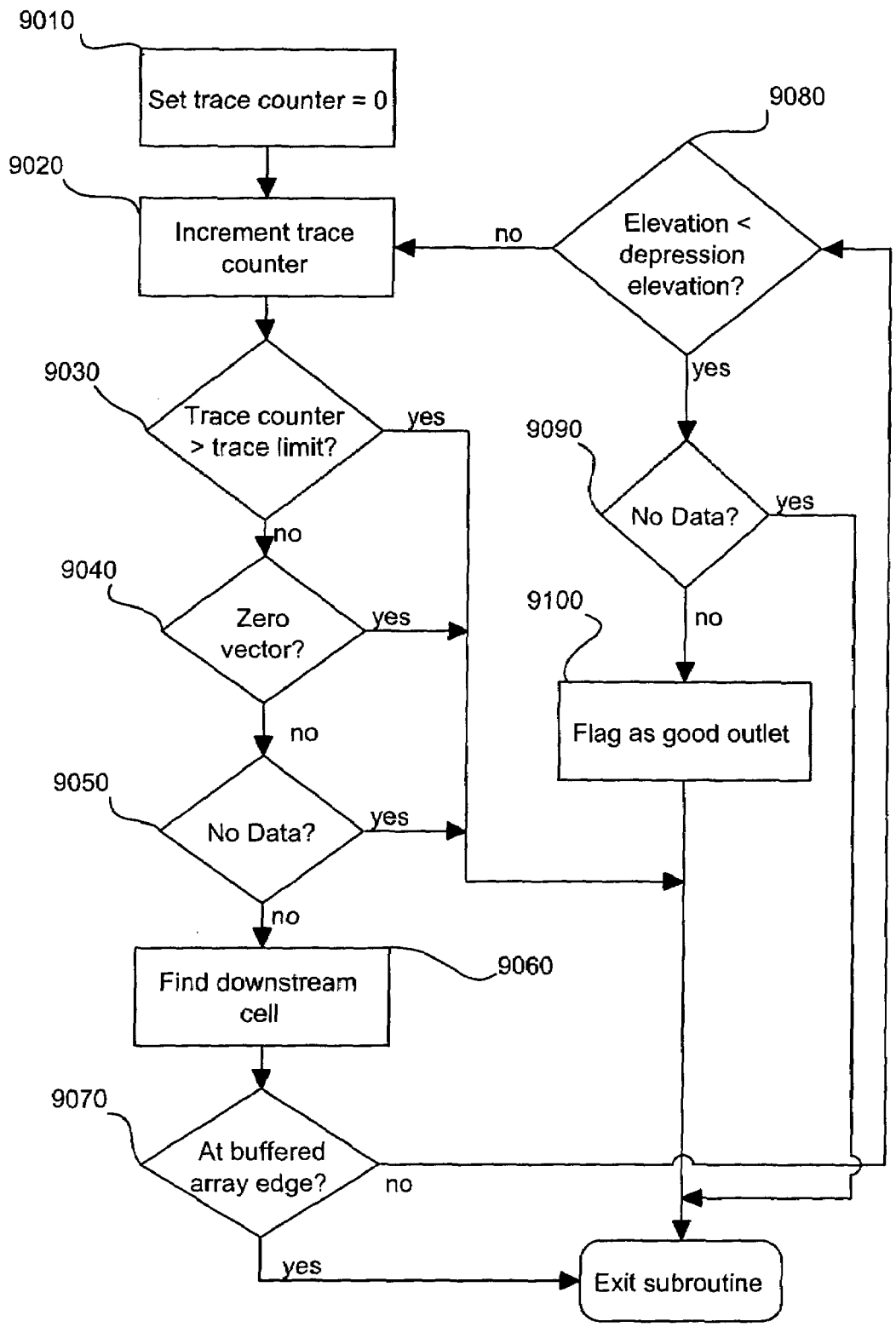
FIG. 12 is a flowchart diagram illustrating the process for determining whether a potential outlet from a depression is a good outlet.

The procedure for testing a possible outlet to determine if it is a good outlet is illustrated in FIG. 12. Once a potential outlet has been identified, the flow is traced downstream to see if this outlet eventually flows to a cell whose elevation is less than that of the original depression. In order to limit the length of the cutlines and to prevent a cutline from looping back on itself, a counter is implemented to track the number of downstream cells required to find a lower elevation. In this context, downstream means finding a cell which follows in the direction of downhill water flow and, therefore, using the D8 method has a lower elevation than an upstream cell. This counter is initialized at 9010, and is incremented at 9020 for every additional cell (it is arbitrarily set at 100 cells). At 9030, a check is performed to make sure that the routine has not created too long of a cutline; if so, the subroutine is exited without flagging this potential outlet as a good outlet. If the trace counter is less than the limit, the routine next checks this cell to see if it is a zero-vector cell at 9040 or a NoData cell at 9050. If either test is true, this outlet is disqualified from becoming a good outlet, so the subroutine is exited. Next, the downstream cell is located at 9060 based on D8 methodologies, and the routine examines this cell. If this cell is at the edge of the buffered array, as determined at 9070, it cannot be a good outlet and the subroutine is exited. Otherwise, if the elevation of this cell is less than the elevation of the original depression, as determined at 9080, and it is not a NoData cell, as determined at 9090, then this cell is flagged as a good outlet at 9100 before exiting the subroutine. If the elevation is greater than or equal to that of the original zero flow vector cell which caused the transfer of processing to the depression handling routine from 4140, as determined at 9080, the process returns to 9020 where the trace counter is incremented, and the routine continues looking further downstream for a different minor cell having a lower elevation.

Figure 13A:
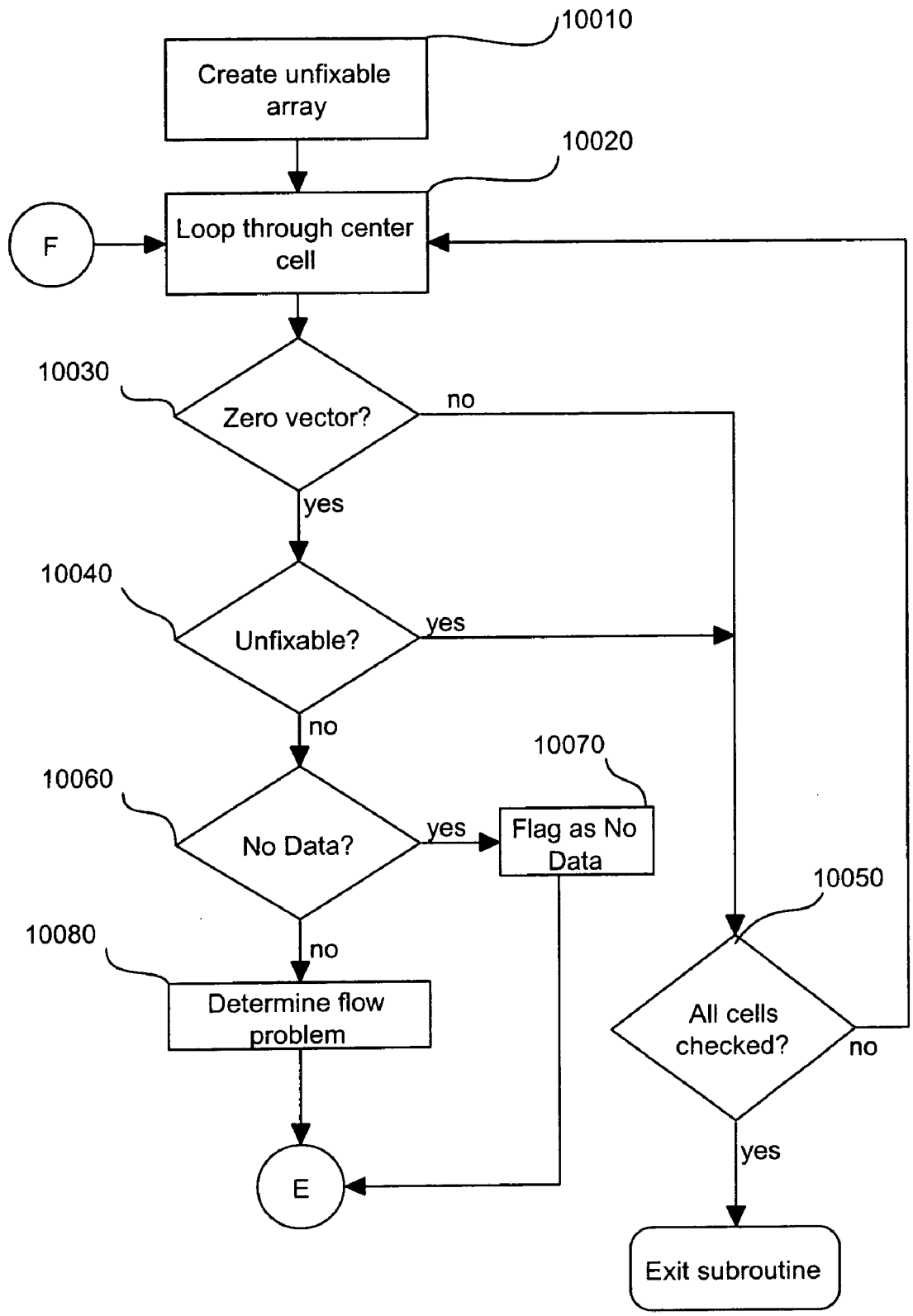
FIGS. 13A and 13B are a flowchart diagram illustrating the general process for fixing flat areas.
Figure 13B:
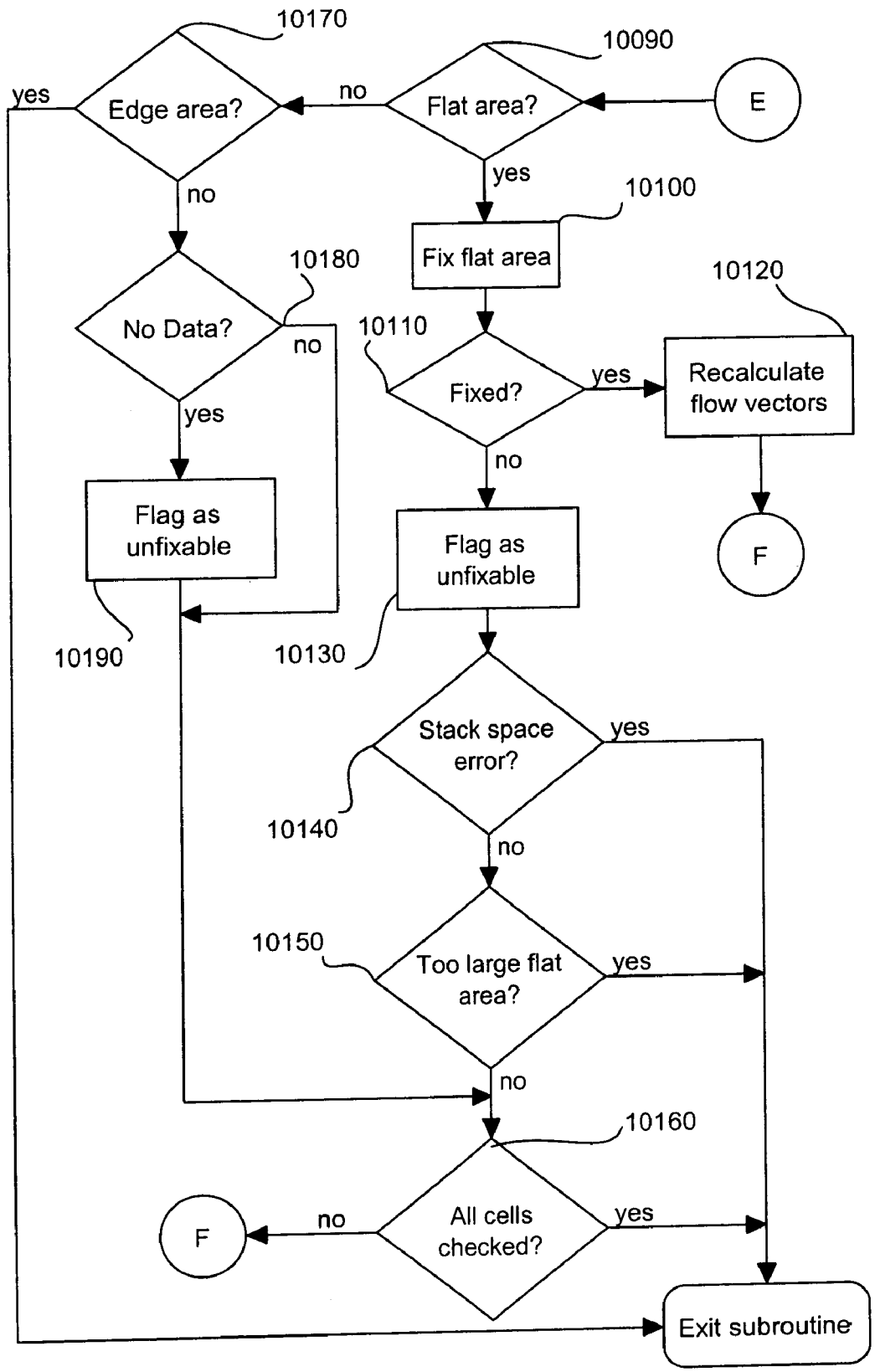

After FAUCET attempts to fix any depressions it next attempts to fix any flat areas. FIGS. 13A and 13B are flowcharts illustrating the overall process for fixing flat areas. First, a Boolean array corresponding to the elevation array is created at 10010 to flag any problem cells that are determined to be unfixable. Unlike the depression fixing routine, the processing order does not rely on determining the highest/lowest flat area; flat areas are handled as they are encountered. At 10020 a successive sweep of data stored in the center cell's extents of the flow vector array is begun to locate and retrieve zero vector cells. Each minor cell of the selected major cell is successively examined moving from left to right, lower row to upper row throughout the selected major cell in order to locate zero vector cells. Note that the order in which cells are examined is not important for purposes of properly completing the described process. When a minor cell is encountered having a zero vector value, as determined at 10030, it is examined at 10040 to ascertain if that cell has already been deemed to be unfixable. If a cell is determined to be unfixable, it is ignored and, after checking whether all cells have been checked at 10050, data is retrieved for the next cell at 10020. The elevation of that cell is then examined at 10060, and if it is −9999 (a NoData cell), then it is flagged as a NoData cell at 10070. If a cell has passed these tests and is not determined to be a NoData cell, a test is performed at 10080 to determine the cause of the problem. This test is the process described with regard to FIG. 8 above. If it is determined at 10090 in FIG. 13B, that the zero-vector is caused by a flat area, processing is transferred to the routine for fixing flat areas at 10100 which is illustrated and discussed with respect to FIG. 14 below. If the flat area-fixing routine successfully fixes the flat area, as determined at 10110, the flow vectors are recalculated for this area at 10120, and FAUCET restarts looping through the center cell at 10020 to locate any remaining flat areas. If the flat area was not fixed, the flat area is flagged as unfixable at 10130, and the errors are checked to see if they are critical errors such as running out of stack space at 10140, or too large of a flat area at 10150, in which case the subroutine for fixing flat areas for this major cell is exited. If the error was not due to a critical problem, the routine continues looping through all cells in the selected major cell looking for other flat areas. If the zero-vector was determined to be due to an edge area at 10170, the flat area fixing routine for this minor cell is exited. If the error is due to a NoData cell, as determined at 10180, the cell is flagged as unfixable at 10190 and the loop continues at 10160. Otherwise, no flagging occurs and processing continues directly to 10160. This process continues until all minor cells in the center cell that are determined to be flat areas have been fixed or are deemed unfixable, at which point this routine is exited and FAUCET moves on to fixing peaks.

Figure 14:
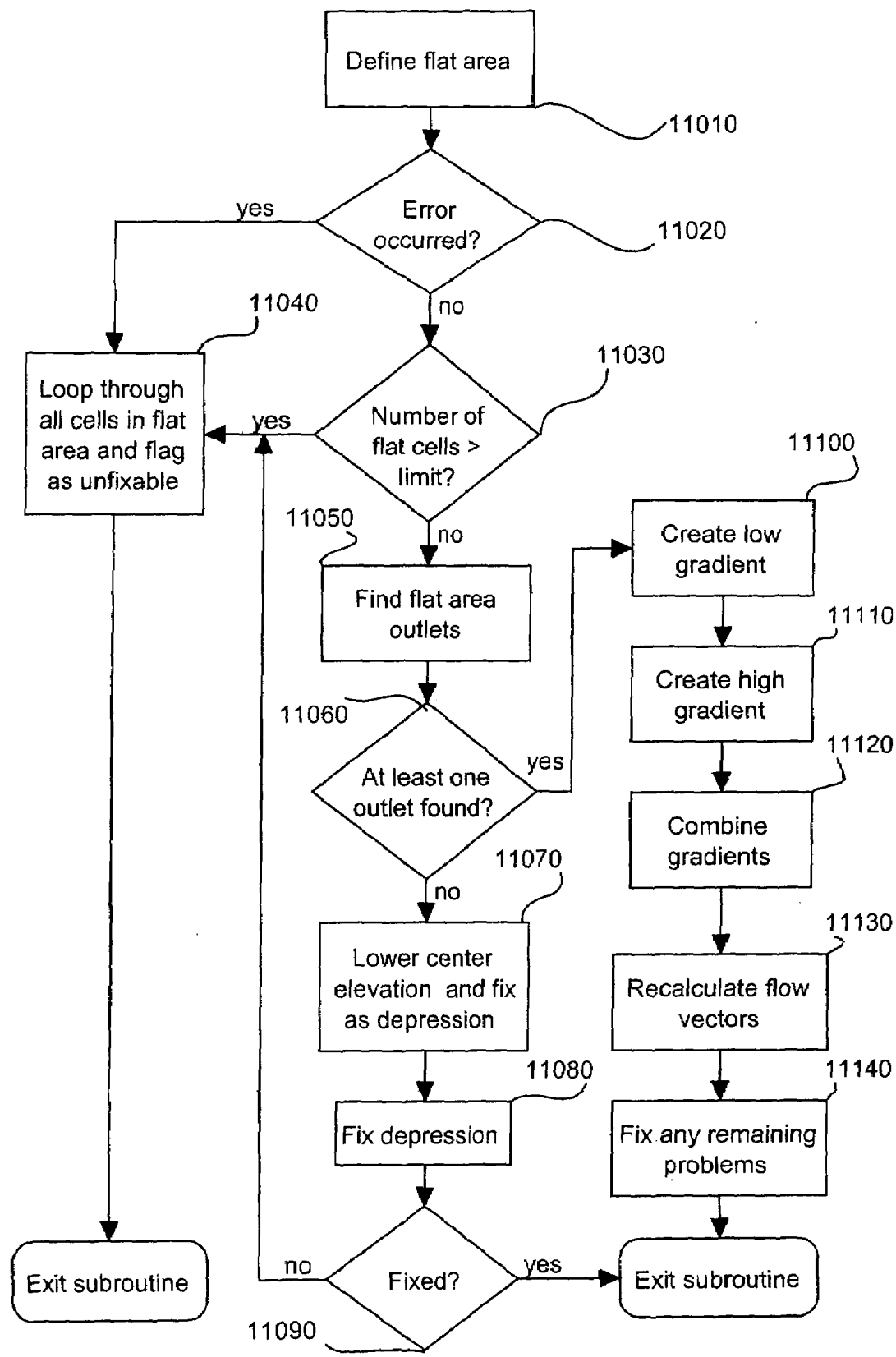
FIG. 14 is a flowchart diagram illustrating in greater detail the process for fixing flat areas.

The details of the actual process for fixing flat areas are illustrated in FIG. 14. The routine for making such corrections is derived largely from the published work of Jurgen Garbrecht and Lawrence W. Martz, described in "The Assignment of Drainage Direction over Flat Surfaces in Raster Digital Elevation Models", Journal of Hydrology, vol. 193 (1997), at 204-213 and "The Treatment of Flat Areas and Depressions in Automated Drainage Analysis of Raster Digital Elevation Models", Hydrological Processes vol. 12 (1998), at 843-855. Given a minor cell that is in a flat area, the first step is to define the extents of the flat area at 11010. This is accomplished by calling a recursive loop that examines neighboring cells to find cells that are at the same elevation as the original flat cell. If this was successful as determined by an error test at 11020, the number of flat cells located is compared to the maximum number of flat cells specified by the user at 11030; if the number is greater than the limit, then all cells in the flat area are flagged as unfixable at 11040 and the subroutine is exited. If not, the next step is to locate the flat area outlets at 11050. Each of the cells in the defined flat area is examined to determine whether there is at least one outlet cell at 11060. An outlet is a cell that has a neighbor outside of the flat area at an elevation lower than the outlet elevation. If no outlets are found, then this is really a flat depression, so the elevation for the center minor cell is lowered slightly at 11070, and at attempt is made to fix this cell at 11080 as a depression by transferring to the process described above with regard to FIGS. 9A, 9B and 9C. If the depression-fixing routine does not work, as determined at 11090, all flat area cells are flagged as unfixable at 11040 and the subroutine is exited. However, if at least one outlet is found at 11060, two different gradients for this flat area are created. At 11100, the first gradient is created on cells that are flowing towards lower elevations. If a cell does not have a neighbor that is lower than its elevation, the elevation for that cell is incremented. This process is repeated until all cells have been used. The process for creating a second gradient away from higher elevations at 11110 is very similar. Then the two gradients are combined and added to the flat area elevation for each cell at 11120 to create a new surface. The changes in elevation to this surface are extremely minor, but they are significant enough that they will route water through this flat area. Flow vectors are recalculated for this area at 11130, and any remaining problems in this area (such as peaks) are fixed at 11140 before exiting the subroutine. At this point, the flat area-fixing algorithm for this flat area is complete and processing returns to handle the next zero vector cell.

Figure 15:
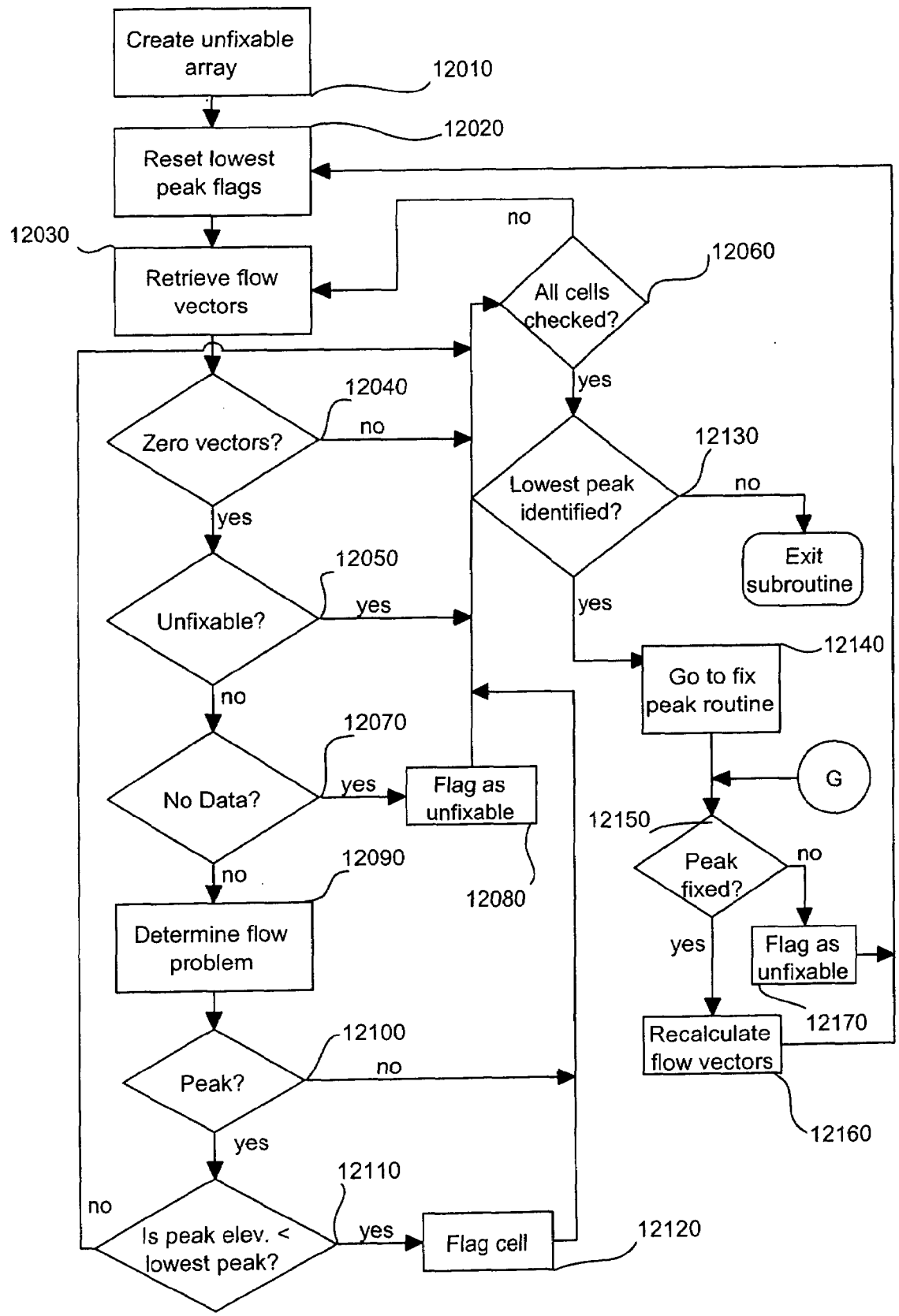
FIG. 15 is a flowchart diagram illustrating the general process for handling zero vector cells in peaks.

The process for fixing peaks is illustrated in FIG. 15. First, a Boolean array corresponding to the elevation array is created at 12010 to flag any problem cells that are determined to be unfixable. Then a flag is created at 12020 that keeps track of the lowest peak problem found. The importance of this variable will become apparent below since the peak fixing routine starts by fixing the lowest peak problems first. At 12030 a successive sweep of data stored in the center cell's extents of the flow vector array is begun to locate and retrieve zero vector cells. Each minor cell of the selected major cell is successively examined moving from left to right, lower row to upper row throughout the selected major cell in order to find and "fix" zero vector cells. Note that the order in which cells are examined is not important for purposes of properly completing the described process. When a minor cell is encountered having a zero vector value, as determined at 12040, it is examined at 12050 to ascertain if that cell has already been deemed to be unfixable. If a cell is determined to be unfixable, it is ignored and data is retrieved for the next cell at 12030 after checking at 12060 whether all cells have already been examined. The elevation of that cell is then examined at 12070, and if it is −9999 (a NoData cell), it is flagged as unfixable at 12080 and data is retrieved for the next cell, if any. If a cell has passed these tests, a further test is performed at 12090 to determine the cause of the flow problem. This test corresponds to the process described with regard to FIG. 8 above. If it is determined at 12100 that the zero-vector is caused by a peak, the elevation of the zero vector cell under consideration is compared to the elevation of the lowest peak already found, if any, at 12110. If the peak being examined is lower than the lowest depression already found, then the variable storing the lowest peak which was set at 12020 is modified at 12120 to reflect this minor cell. If all minor cells have not been checked for peaks at 12060, then processing continues at 12030 to retrieve the next zero vector cell that is a peak. Once all peak cells have been identified and examined as indicated at 12060, a check is performed at 12130 to determine if the flag has been set indicating that a cell has been identified as having the lowest peak elevation. Peaks with lower elevations are fixed first to alleviate the case in which one potential solution for a peak flows to another peak problem cell. If a lowest peak has been identified, processing is transferred at 12140 to the routine for fixing peaks that is illustrated and discussed with respect to FIGS. 16A and 16B below. If the peak-fixing routine successfully fixes the peak as indicated at 12150, the flow vectors are recalculated for this area at 12160, the lowest peak variable is reset at 12020, and FAUCET starts looping through the center cells again to determine the next lowest remaining peak. If the peak-fixing routine is unsuccessful, this minor cell is flagged as unfixable at 12170, the lowest peak variable is reset at 12020, and FAUCET attempts to look for the next lowest peak. This process continues until all minor cells in the center cell that are determined to be peaks have been fixed or are deemed unfixable, at which point this routine is exited.

Figure 16A:
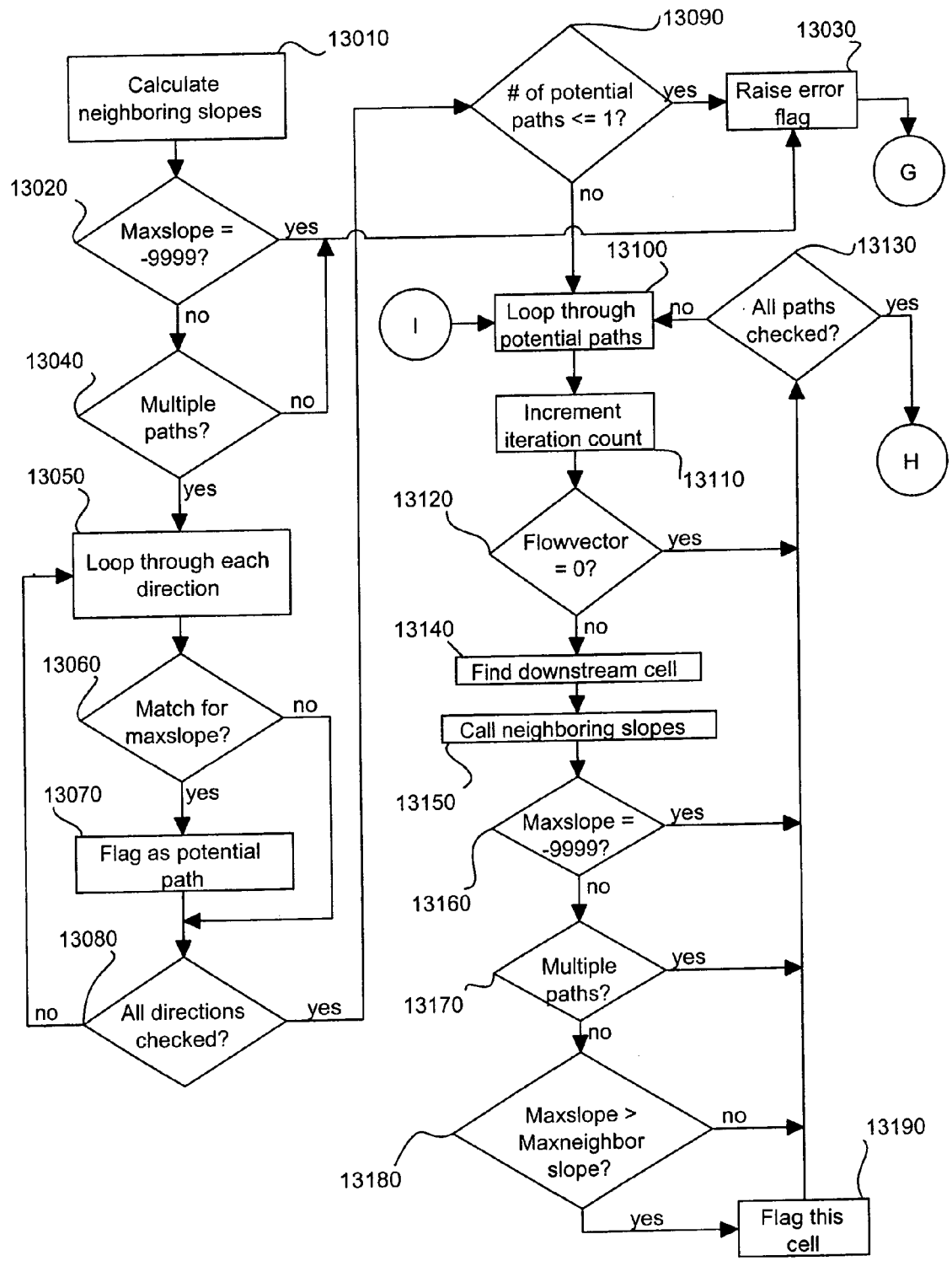
FIGS. 16A and 16B are a flowchart diagram illustrating in detail the process for handling zero vector cells in peaks.
Figure 16B:
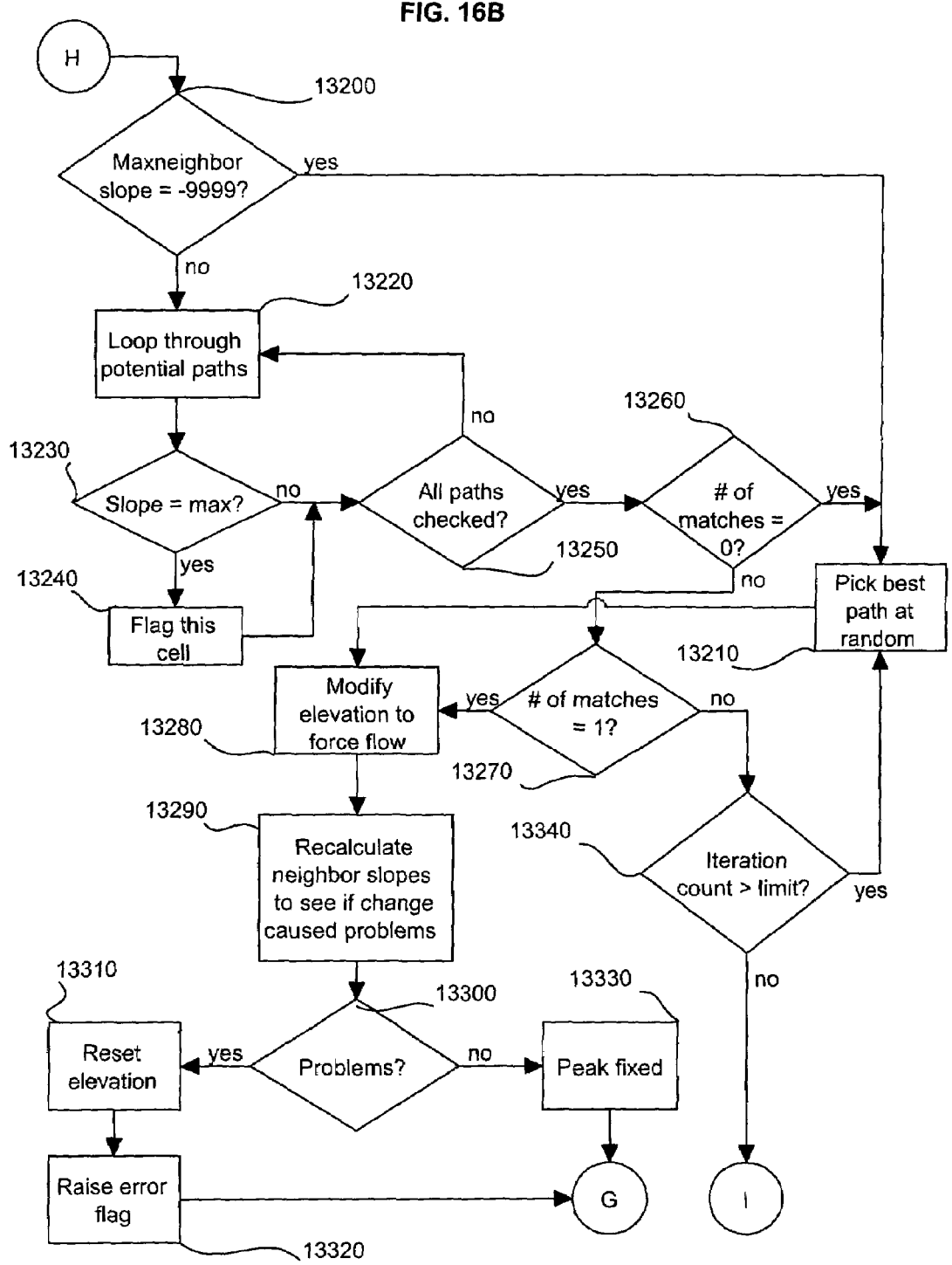

Once a minor cell has been identified as a peak, FAUCET attempts to fix this peak. This process is illustrated in FIG. 16A and 16B. At 13010 the slope is calculated for each of the identified peak's eight neighboring cells. If the maximum downstream slope equals −9999 at 13020 then an error is raised at 13030 and the peak fixing routine is exited. If multiple best solutions are not found at 13040, then this cell is not a peak so an error is raised and the routine is exited. If there are multiple paths, the routine loops through each D8 direction at 13050 and flags the directions that are the potential best paths. To do this, the slope of the neighboring cell is compared at 13060 to the maximum slope calculated at 13010. If the slope matches, then this direction is flagged as a potential path at 13070. This is repeated until all eight directions have been checked as indicated at 13080. If the number of potential paths is less than or equal to one as determined at 13090, then this is not a peak, an error flag is raised at 13030 and the routine is exited. However, if there are multiple paths then the routine loops through each potential path and attempts to find the steepest downstream slope for that neighbor. If there are still multiple best solutions, then the routine keeps looking downstream until a best solution is found. In order to keep this process from going on forever, the maximum number of downstream iterations is limited to 10, although this number could be higher or lower. The routine starts looping through the potential paths at 13100, and increments the iteration counter at 13110. If the flow vector for this path is a zero-vector as determined at 13120, this path is discarded as a potential path because problems exist, and a new path is sought at 13130. If not, the next cell downstream is located at 13140, and the neighboring slopes are calculated for it at 13150. As before, if the maximum slope of the neighbors is −9999 as determined at 13160, then this path is no longer viewed as a potential path. If multiple solutions exist for this path as determined at 13170, another problem has been encountered and this path is no longer a potential path. The neighbor with the maximum slope as determined at 13180 is flagged at 13190. Thus, at 13060 the potential path having the steepest downstream slope is sought. The best path will by definition have the maximum slope. In succeeding iterations, when each of the remaining potential paths is tested to determine the maximum slope from each, if one proves to be the steepest, the original potential path is set equal to the best solution and elevation is modified to flow in that direction. The maximum slope is being reset to be equal to the maximum slope found at the endpoint of the best potential path. Once all potential paths have been checked, a test is performed at 13200 in FIG. 16B to see if the maximum slope from each remaining potential flowpath equals −9999. If so, there is no best solution for this, and the best path is selected at random at 13210. This procedure comprises taking the number of remaining potential flow paths, dividing that number by 2 and designating the potential path that corresponds to this number as having the best flow path. Thereafter, processing continues with a modification of the elevation at 13280 and recalculation of flow vectors, as described below. If a slope was found, the routine loops through each remaining potential path beginning at 13220 to determine at 13230 if the slope equals the maximum slope. If so, the cell in the potential path being examined is flagged at 13240. Once all paths have been checked as determined at 13250, a test is performed at 13260 to see if any potential flowpaths remain. If none remain, a best path is selected at random at 13210 and processing returns to 12150 in FIG. 15. If there is one unique best solution, as determined at 13270, the elevation is modified to force the flow in this direction at 13280 and the neighboring slopes in this immediate vicinity are recalculated at 13290. This modification artificially lowers the elevation of the neighbor cell of the original zero vector cell into which the designated best flow path first empties from the original zero vector cell preferably by a very small amount such as 0.000001 ft, although larger modifications can be used. This forces the new downstream slope of this neighbor to be the greatest slope for the original center cell. Then the flow vectors for all of the original peak's neighbors are checked at 13300 to make sure that no new problems were introduced or flow directions changed by virtue of the elevation alteration. If this elevation change caused any problems, the elevation is returned to the original value at 13310, an error flag is raised at 13320 and the routine is exited by returning processing to 12150 in FIG. 15. If no problems are encountered, FAUCET considers this peak to be fixed at 13330, and the peak fixing routine is exited by returning processing to 12150 in FIG. 15. If more than one solution remains at 13270, a test is performed at 13340 to see if the iteration count is greater than the predefined limit, in which case a best path is selected at random at 13210. If not, the routine returns to 13100 in FIG. 16A and loops through the remaining potential paths in an effort to find the best solution.

The method of this invention is compatible with most other hydrologic and hydraulic models and provides tools to evaluate flow vectors in a given topology in the context of those models while also providing the user the capability to easily develop "what if" scenarios. In order to practice the method of this invention, a computer system is required having an operating system such as Windows 98, Windows 2000 or Windows NT. This computer can be run either as a single station system or a networked system and can be installed on a desktop, laptop or notepad computer so long as the computer has a minimum of 128 megabytes of RAM, 150 megabytes of storage space on a hard drive; at least a Pentium class processor, video display resolution of at least 800 ×600 with a minimum of 256 colors. It would also be useful for the installed computer system to be Internet accessible through Microsoft Internet Explorer 5.5 or higher. Furthermore, use of the method of this invention assumes the preexistence of and access to stored databases, GIS shapefiles and survey data from which data is extracted and used to create TIN's and/or DEM's, as required. The data may be in a large variety of formats, including, but not limited to, LIDAR data, AutoCAD DXF's, shapefiles and numerous versions of ASCII such as ArcInfo-generated Grid ASCII files.

The method of this invention is a customized, stand-alone program written in Visual Basic using ESRI's MapObjects and SDE technology. The program may be accessed through a graphical user interface known to those in the art and to users of geographical information system (GIS) software.

The process steps disclosed herein are not the only way in which the function of this invention can be implemented. Other embodiments and sequences of steps are possible so long as the overall method and advantages described above are preserved.

The invention claimed is:

1. A computer-implemented method using a computer having a display and a memory for storage of information representative of hydrologic and hydraulic conditions for determining water flow directions based on flow vector values calculated in part with a D8 method applied to a watershed divided into more than one predefined, rectangular major cell each encompassing a minimum of nine predefined, rectangular minor cells including a center minor cell and eight neighbor minor cells wherein the watershed includes one or more types of problem areas identified as depressions, flat areas or peaks each of which extends across more than one major cell and each of which requires fixing and wherein further the number, location and elevation of all minor cells are known as are a maximum depth depression to be corrected, a maximum number of downstream minor cells to check in fixing depressions and peaks, a largest depression area to fix and a largest flat area to fix, comprising:

selecting and designating one major cell for which to begin generating flow vector values;

creating a buffered array in the memory containing elevation and identification data for all minor cells in the designated major cell and all major cells bordering the designated major cell;

calculating flow vector values for each minor cell within the buffered array using the D8 method wherein a flow vector value of zero is assigned to any minor cell located in a problem area for which a flow vector value cannot be calculated using the D8 method;

storing in the memory the calculated flow vector values in association with the minor cell to which they relate;

checking the flow vector value of each minor cell within the designated major cell until all cells have been checked and all cells having a flow vector value of zero have been found;

assigning a problem type in the memory to each minor cell within the designated major cell having a flow vector value of zero;

fixing first all minor cells in the designated major cell to which a depression problem type has been assigned wherein depressions are fixed independently and successively from the highest depression to the lowest depression and elevation changes are imposed on minor cells in the buffered array, as required;

fixing second all minor cells in the designated major cell to which a flat area problem type has been assigned wherein each flat area is fixed independently and elevation changes are imposed on minor cells in the buffered array, as required;

fixing third all minor cells in the designated major cell to which a peak problem type has been assigned wherein peaks are fixed independently and successively from the lowest peak to the highest peak and elevation changes are imposed on minor cells in the buffered array, as required;

recalculating and storing in the memory flow vector values for each minor cell within the buffered array using the D8 method wherein a flow vector value of zero is assigned to any minor cell located in a problem area for which a flow vector value cannot be calculated using the D8 method;

checking again the flow vector value of each minor cell within the designated major cell until all cells have been checked and all cells having a flow vector value of zero, if any, are found;

if any minor cells having a flow vector value of zero have been found, assigning a problem type in the memory to each minor cell having a flow vector value of zero;

fixing first all minor cells in the designated major cell to which a depression problem type has been assigned wherein depressions are fixed independently and successively from the highest depression to the lowest depression by imposing elevation changes on minor cells in the buffered array, as required;

fixing second all minor cells in the designated major cell to which a flat area problem type has been assigned wherein each flat area is fixed independently by imposing elevation changes on minor cells in the buffered array, as required;

fixing third all minor cells in the designated major cell to which a peak problem type has been assigned wherein peaks are fixed independently and successively from the lowest peak to the highest peak and elevation changes are imposed on minor cells in the buffered array, as required;

storing in the memory the elevation and flow vector value associated with each minor cell as changed, if necessary;

selecting and designating a previously unselected major cell and repeating the process beginning with creating a buffered array; and retrieving the elevation and flow vector value for the watershed stored in the memory to depict on the display at least one of a basin delineation, flowpath tracing, drainage area calculation, the extents of hazardous waste spills and a streamline.

2. The method of claim 1 wherein calculating for each minor cell further comprises:

retrieving identification and elevation data for the minor cell;

if that minor cell is located on the edge of the buffered array, assigning a flow vector value of zero to that minor cell;

if a distinct flow direction from that minor cell to one of its eight neighboring minor cells can be ascertained, assigning a flow vector value of between one and nine to the minor cell wherein each number represents a different direction; and otherwise assigning a flow vector value of zero to the minor cell.

3. The method of claim 1 wherein assigning for each minor cell having a zero flow vector value further comprises:

obtaining the location and elevation of all neighbor minor cells of the minor cell;

if the minor cell is at the edge of the buffered array, assigning the problem type as "edge";

otherwise, calculating the slope from the minor cell to each of its eight surrounding neighbor cells in order to find a maximum slope and, if the elevation of the minor cell is lower than each of those neighbor minor cells, assigning the problem type as "depression";

if the maximum slope from the minor cell to one or more neighbor minor cells equals zero assigning the problem type as "flat"; and if the maximum slope from the minor cell to more than one neighbor minor cell does not equal zero, assigning the problem type as "peak".

4. The method of claim 1 wherein fixing first is a subroutine comprising:

initializing a first variable in the memory to track a highest depression elevation found;

flagging in the memory that original minor cell in the designated major cell having a zero flow vector value which has a highest elevation as compared with all other minor cells having zero flow vector values located in the designated major cell;

retrieving from the memory location and elevation data for the flagged original minor cell and its neighbor minor cells;

setting an initial depth limit in the memory to a preselected amount to limit the maximum depth depression to correct;

initializing a second variable in the memory to track the number of times the maximum depth depression has been modified up to a preselected maximum number of times;

creating a depression array in the memory mirroring the buffered array for identifying those minor cells which contribute to the depression;

increasing the second variable in the memory by one;

defining an area contributing to the depression;

identifying potential outlets from the depression;

determining whether any of the potential outlets from the depression is a good outlet;

if no good outlet is found,
  exiting the subroutine if
    the contributing area extends beyond the buffered array; or
    the number of maximum depth modification attempts equals the preselected maximum number of times;
  otherwise, incrementing the depth limit in the memory by an amount equal to one-eighth of the initial depth limit;
  if the depth limit is greater than the combination of the elevation of the flagged original minor cell and the depth limit, exiting the subroutine;
  otherwise, returning to creating a depression array;

if a good outlet exists,
  choosing the good outlet having the lowest elevation;
  drawing a hypothetical straight line in the memory from the center of the flagged original minor cell to the good outlet cell;
  extending the hypothetical straight line in the memory to follow a downstream path to an elevation lower than the elevation of the flagged original minor cell;
  burning a cutline into the buffered array in the memory by correcting elevations in minor cells, as necessary;
  recalculating and storing in the memory the flow vector values for all minor cells in the buffered array; and
  unless all depressions are fixed or there is no more data, returning to flagging.

5. The method of claim 4 wherein the initial depth limit is set at one-half of the originally specified maximum depth depression.

6. The method of claim 4 wherein defining further comprises:

obtaining data identifying the location and elevation of a center minor cell;

testing each of the eight neighbor minor cells surrounding the center minor cell to determine if the elevation of any neighbor minor cell is greater than or equal to the elevation of the center minor cell;

if so, flagging the center minor cell as a contributing minor cell and redesignating that neighbor minor cell as the center minor cell if the elevation of the neighbor minor cell is less than the initial depth limit and the neighbor minor cell is not located at the edge of the buffered array;

returning to obtaining data until all neighbor minor cells of all minor cells in the buffered array have been tested or until a stack space error is encountered or the center minor cell is determined to be located at the edge of the buffered away in which case the subroutine is exited.

7. The method of claim 6 including the following after defining:
if an error is encountered during the defining,
exiting the subroutine if stack space has been exceeded, the area has already been flagged as too shallow or the preselected maximum number of times to attempt fixing the depression array has been reached;
incrementing the depth limit;
if the depth limit after incrementing is less than the elevation of the flagged original minor cell plus the initial depth limit,
resetting the depression array;
incrementing the second variable by one; and
returning to defining;
otherwise, exiting the subroutine.

8. The method of claim 7 wherein in incrementing the depth limit is increased by one-eighth of the initial depth limit.

9. The method of claim 4, wherein identifying potential outlets further comprises:
obtaining data identifying the location and elevation of a contributing minor cell and of its neighbor minor cells;
identifying which of the eight neighbor minor cells of the contributing minor cell is not part of the contributing area;
testing whether the elevation of any such neighbor minor cell is less than the elevation of the contributing minor cell;
if so, flagging such neighbor minor cell as an exterior cell;
after all neighbor minor cells have been so tested, further flagging the contributing minor cell as a potential outlet if at least one neighbor minor cell has been flagged as an exterior cell.

10. The method of claim 9, wherein determining is a further subroutine further comprising:
obtaining data identifying the location and elevation of a contributing minor cell flagged as a potential outlet and of its neighbor minor cells;
setting a trace counter equal to zero;
incrementing the trace counter by one;
exiting the further subroutine if the trace counter indicates a value greater than the maximum number of downstream cells permitted to be checked;
obtaining data for the location and elevation of the next downstream minor cell;
testing whether that downstream cell is located at the edge of the buffered array;
if so, exiting the subroutine;
if not, further testing whether the elevation of the downstream minor cell is less than the elevation of the flagged original minor cell;
if so, flagging the potential outlet as a good outlet and exiting the further subroutine; and
if not, returning to incrementing the trace counter.

11. The method of claim 1 wherein fixing third is a subroutine comprising:
flagging in the memory that original minor cell in the designated major cell having a zero flow vector value which has a lowest elevation as compared with all other minor cells having zero flow vector values located in the designated major cell;
retrieving from the memory the location and elevation data for the flagged original minor cell and its neighbor minor cells;
finding and storing in the memory a maximum slope existing between the flagged original minor cell and one of its neighbor minor cells using the D8 method;
identifying each neighbor minor cell where the slope between that cell and the flagged original minor cell equals the maximum slope;
marking each such neighbor minor cell in the memory as a potential path;
if there are not multiple potential paths, exiting the subroutine;
tracing each potential path downstream from each flagged neighbor minor cell up to the specified maximum number of downstream cell iterations wherein for each iteration the maximum slope is reset in the memory to be equal to the steepest slope between a downstream cell and one of its neighbor minor cells if that slope is the steepest slope found from that downstream cell;
selecting a single potential path at random from all of the initial possible potential paths;
designating the selected single potential path in memory as a best path if all potential paths have been checked and either the maximum slope for each potential path equals −9999 or no potential path has a slope equal to the maximum slope or there is more than one potential path having a slope equal to the maximum slope, otherwise, designating the single potential path with a slope equal to the maximum slope in the memory as a best path;
lowering the elevation stored in the memory for the first neighboring minor cell of the flagged original minor cell along which the best path runs;
recalculating and storing in the memory flow vector values for all minor cells in the buffered array; and
unless all peaks are fixed or there is no more data, returning to flagging.

12. The method of claim 11 wherein selecting a single potential path further comprises:
identifying each potential path with a sequential number beginning at one;
dividing the number of remaining potential paths by two to obtain a quotient; and
selecting the potential path having the sequential number corresponding to the quotient.

13. The method of claim 11 wherein the lowering step comprises reducing the elevation by 0.000001 feet.

14. The method of claim 11 wherein lowering is followed by:
verifying that lowering of the elevation does not introduce unexpected problems or undesirable flow direction changes; and
if problems or changes were introduced, returning the elevation to its original level and exiting the subroutine.

* * * * *